(12) United States Patent
Saito

(10) Patent No.: US 7,099,691 B2
(45) Date of Patent: Aug. 29, 2006

(54) MOBILE RADIO TERMINAL APPARATUS

(75) Inventor: Naritoshi Saito, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 152 days.

(21) Appl. No.: 10/943,892

(22) Filed: Sep. 20, 2004

(65) Prior Publication Data

US 2005/0202813 A1    Sep. 15, 2005

(30) Foreign Application Priority Data

Mar. 10, 2004   (JP)   ............... 2004-066988

(51) Int. Cl.
*H04Q 7/20* (2006.01)

(52) U.S. Cl. ............... 455/552.1; 455/553.1; 375/136; 375/144

(58) Field of Classification Search ............ 455/432.2, 455/552.1, 553.1, 550.1, 403, 407, 500, 526, 455/73, 101; 375/267, 136, 137, 144, 147, 375/148

See application file for complete search history.

(56) References Cited

U.S. PATENT DOCUMENTS

| | | | | |
|---|---|---|---|---|
| 5,999,560 A * | 12/1999 | Ono | ............ | 375/148 |
| 6,138,001 A * | 10/2000 | Nakamura et al. | ......... | 340/7.35 |
| 6,731,911 B1 * | 5/2004 | Hirata et al. | .................. | 455/71 |
| 6,895,220 B1 * | 5/2005 | Usui | ......................... | 455/41.2 |
| 6,904,080 B1 * | 6/2005 | Hokao | ........................ | 375/148 |
| 2002/0128016 A1 * | 9/2002 | Wong et al. | ................ | 455/450 |

* cited by examiner

*Primary Examiner*—CongVan Tran
(74) *Attorney, Agent, or Firm*—Finnegan, Henderson, Farabow, Garrett & Dunner, L.L.P.

(57) ABSTRACT

A control unit controls a 1x RAKE receiving unit to intermittently receive a paging signal transmitted from a first base station in a first cycle, in the first cycle. The control unit also controls a 1xEV-DO RAKE receiving unit to intermittently receive a paging signal transmitted from a second base station in a second cycle, in a cycle which is a multiple of natural number n of the second cycle.

8 Claims, 15 Drawing Sheets

MOBILE RADIO TERMINAL APPARATUS

CROSS-REFERENCE TO RELATED APPLICATIONS

This application is based upon and claims the benefit of priority from prior Japanese Patent Application No. 2004-066988, filed Mar. 10, 2004, the entire contents of which are incorporated herein by reference.

BACKGROUND OF THE INVENTION

1. Field of the Invention

This invention relates to a mobile radio terminal apparatus having two radio connection schemes.

2. Description of the Related Art

As a mobile radio system having two radio connection schemes, the cdma (Code Division Multiple Access) 2000 is known.

The cdma2000 system is capable of making radio connection between a mobile station and a base station in two schemes, i.e. 1x communication scheme (hereinafter called "1x") and 1xEV-DO communication scheme (hereinafter called "1xEV-DO").

In the 1x, a speech service, SMS (Short Message Service) and a packet communication service having a download speed of about 100 kbps are provided. The 1xEV-DO is employed only to provide a packet communication service having a download speed of higher than 100 kbps. To improve the radio use efficiency of the 1xEV-DO packet communication service, the 1x and 1xEV-DO services are provided at mutually different frequencies.

In a mobile radio terminal apparatus employed in a conventional mobile radio system having two radio connection schemes, however, much battery power is consumed at simultaneous standby in the two radio connection schemes.

BRIEF SUMMARY OF THE INVENTION

The present invention has been accomplished to solve the above-described problem. The object of the present invention is to provide a mobile radio terminal apparatus capable of saving battery power consumption at simultaneous standby in the two radio connection schemes without complicating a hardware configuration.

According to an aspect of the present invention, there is provided a mobile radio terminal apparatus comprising first receiving means for receiving a radio signal transmitted from the first base stations, second receiving means for receiving a radio signal transmitted from the second base stations, first control means for controlling the first receiving means to receive the paging signal by conducting an intermittent operation in the first cycle, and second control means for controlling the second receiving means to receive the paging signal by conducting an intermittent operation in a cycle which is a multiple of natural number n of the second cycle.

In the present invention, the paging signal transmitted from the first base stations in the first cycle is intermittently received in the first cycle, and the paging signal transmitted from the second base stations in the second cycle is intermittently received in a cycle which is a multiple of natural number n of the second cycle.

Since the paging signal transmitted from the second base stations is received in a cycle which is a multiple of natural number n of the second cycle, the present invention can provide a mobile radio terminal apparatus capable of saving battery power consumption at simultaneous standby in the two radio connection schemes without complicating a hardware configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the accompanying drawings.

Figure 1:
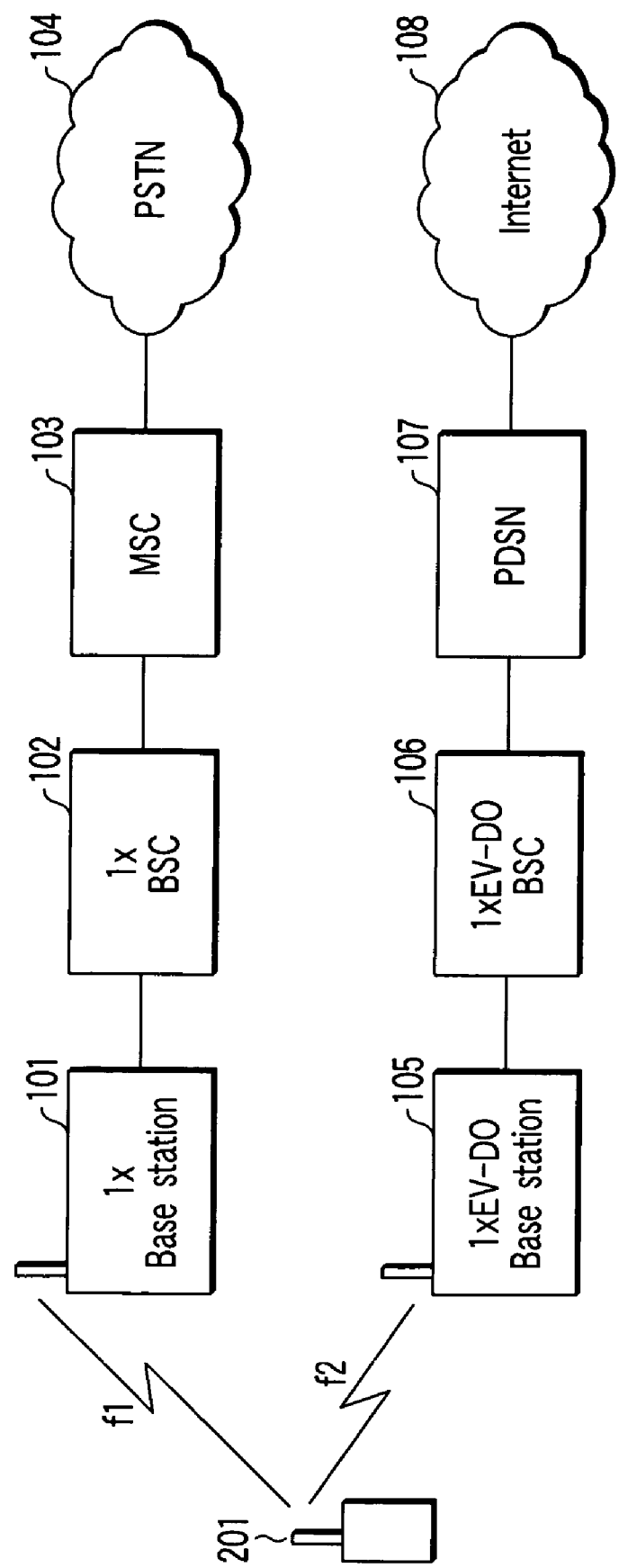
FIG. 1 shows an illustration of a configuration of a mobile radio system according to the embodiment of the present invention.

FIG. 1 shows a configuration of a mobile radio system according to the embodiment of the present invention. An example of the cdma2000 system is explained here. The present invention can be applied not only to the cdma2000 system, but also a network capable of providing a speech service as a first radio system and a packet communication service as a second radio system.

The cdma2000 system is capable of making radio connection in two schemes, i.e. 1x communication scheme (hereinafter called "1x") and 1xEV-DO communication scheme (hereinafter called "1xEV-DO").

The 1x network includes a 1x base station 101, a 1x BSC (Base Station Controller) 102, a MSC (Mobile Switching Center) 103, a PSTN (public network) 104 and the like. The 1x service includes the speech service, SMS (Short Message Service) and the packet communication service having a download speed of about 100 kbps.

The 1xEV-DO network includes a 1xEV-DO base station 105, a 1xEV-DO BSC 106, a PDSN (Packet Data Serving Node) 107, INTERNET (Internet network) 108 and the like. The 1xEV-DO service includes the packet communication service having a download speed of higher than 100 kbps.

A mobile radio terminal apparatus 201 is a dual radio terminal which can receive both the 1x service and the 1xEV-DO service. If the mobile radio terminal apparatus 201 is operated for the 1x service, the mobile radio terminal apparatus 201 makes radio connection with the 1x base station 101 at a frequency f1. If the mobile radio terminal apparatus 201 is operated for the 1xEV-DO service, the mobile radio terminal apparatus 201 makes radio connection with the 1xEV-DO base station 105 at a frequency f2.

Next, a method of synchronizing system timings of the 1x base station 101 and the 1xEV-DO base station 105 is explained with reference to FIG. 2. Each of 1x base station 101 and the 1xEV-DO base station 105 has a function of receiving GPS signals from GPS 301, GPS 302 and GPS 303 that are GPS (Global Positioning System) satellites.

The 1x base station 101 and the 1xEV-DO base station 105 synchronize the system timings on the basis of the GPS signals received from the GPS satellites. For this reason, the system timing of the 1x base station 101 and the system timing of the 1xEV-DO base station 105 are synchronized with each other.

Figure 2:
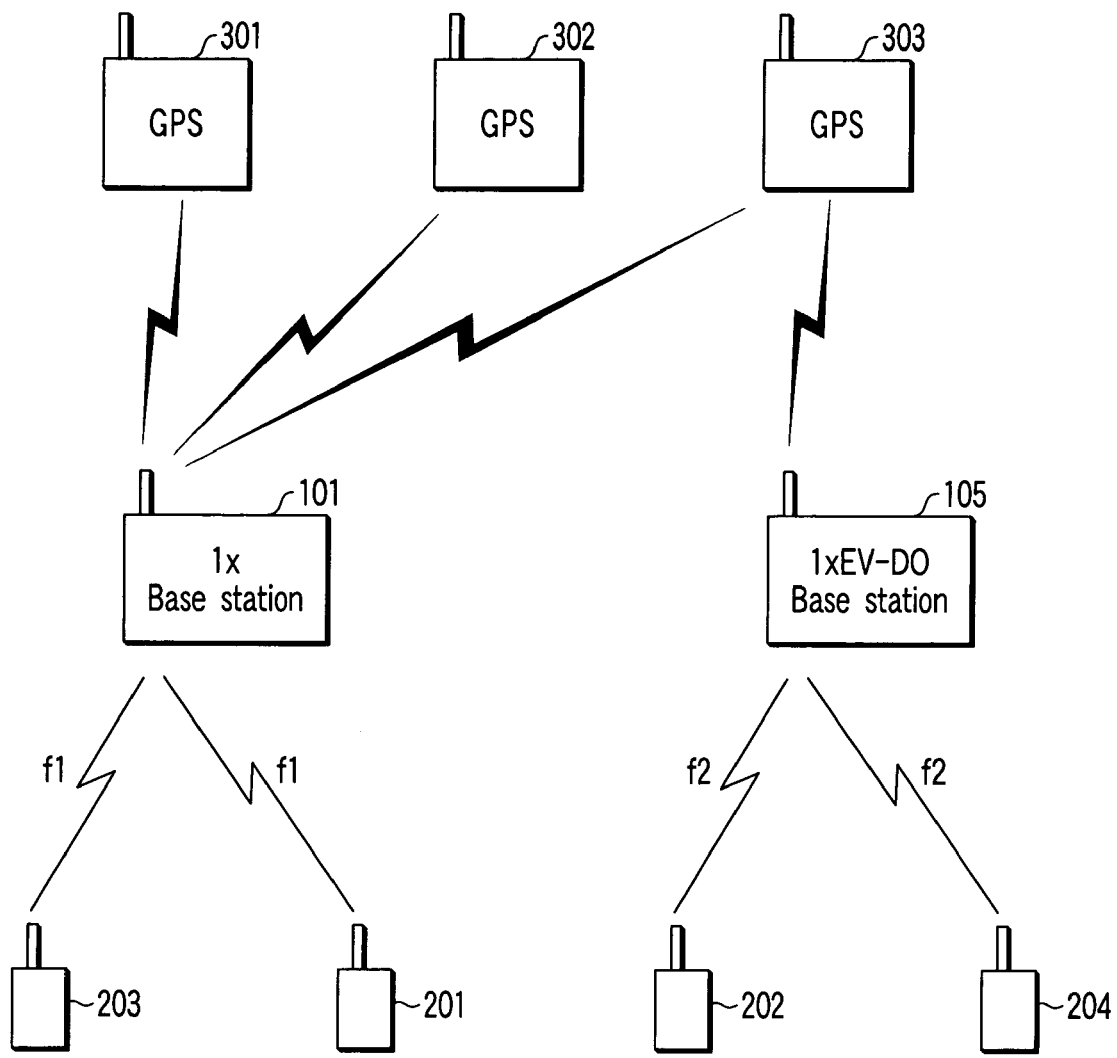
FIG. 2 shows an illustration of an operation of synchronizing system timings by base stations of the mobile radio system shown in FIG. 1.

In FIG. 2, the mobile radio terminal apparatuses 201 and 202 are dual radio terminals which can respond to both the 1x and the 1xEV-DO. A 1x radio terminal 203 is a radio terminal for the 1x. A 1xEV-DO radio terminal 204 is a radio terminal for the 1xEV-DO.

The mobile radio terminal apparatus 201 and the 1x radio terminal 203 make radio connection with the 1x base station 101 at the frequency f1 to receive the 1x service. They acquire timing information over SYNC (synchronization) channel transmitted from the 1x base station 101 and synchronize with the 1x base station 101 on the basis of the acquired timing information.

The mobile radio terminal apparatus 202 and the 1xEV-DO radio terminal 204 make radio connection with the 1xEV-DO base station 105 at the frequency f2 to receive the 1xEV-DO service. They acquire timing information over SYNC (synchronization) channel transmitted from the 1xEV-DO base station 105 and synchronize with the 1xEV-DO base station 105 on the basis of the acquired timing information.

As a result, the overall system of the 1x base station 101, the 1xEV-DO base station 105, the mobile radio terminal apparatuses 201 and 202, the 1x radio terminal 203 and the 1xEV-DO radio terminal 204 synchronizes with the GPS 303.

In the example shown in FIG. 2, the 1x base station 101 and the 1xEV-DO base station 105 receive the GPS signal from the GPS 303 to synchronize the system timings. The present invention is not limited to this, but can be applied to a system which allows the 1x base station 101 and the 1xEV-DO base station 105 to make direct communication with each other and synchronize the system timings.

Figure 3:
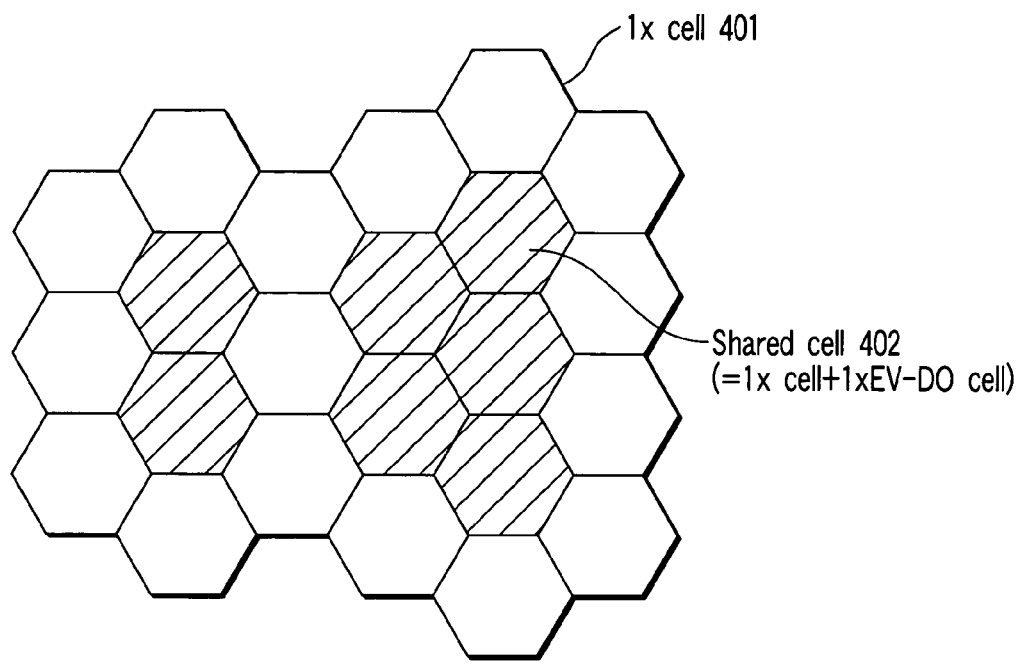
FIG. 3 shows an illustration of cell arrangement in the mobile radio system shown in FIG. 1.

Cells are arranged as shown in FIG. 3. A 1x cell 401 having no hatch pattern is a cell for the 1x in which only 1x base station 101 is arranged. A shared cell 402 including a hatch pattern is a cell in which the 1x base station 101 and the 1xEV-DO base station 105 are arranged.

In general, since the 1xEV-DO base station 105 is arranged after the 1x base station 101 is arranged, the 1x service can be provided in substantially 100% of cells while the 1xEV-DO service can be provided in limited cells. The cells for the 1xEV-DO service only cannot be provided due to the efficiency of demand.

Figure 4:
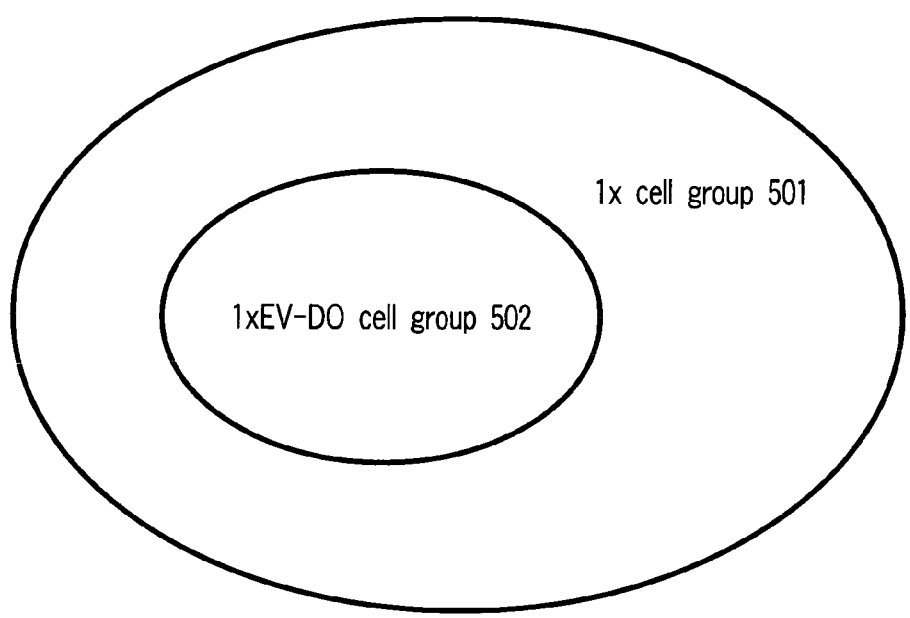
FIG. 4 shows an illustration of a relationship between cell groups in the mobile radio system shown in FIG. 1.

In other words, a cell group 502 to which the 1xEV-DO is provided is located inside a cell group 501 to which the 1x service is provided, and the cell group 501 includes an area for the only 1x service which does not provide the 1xEV-DO service, as shown in FIG. 4.

Figure 5:
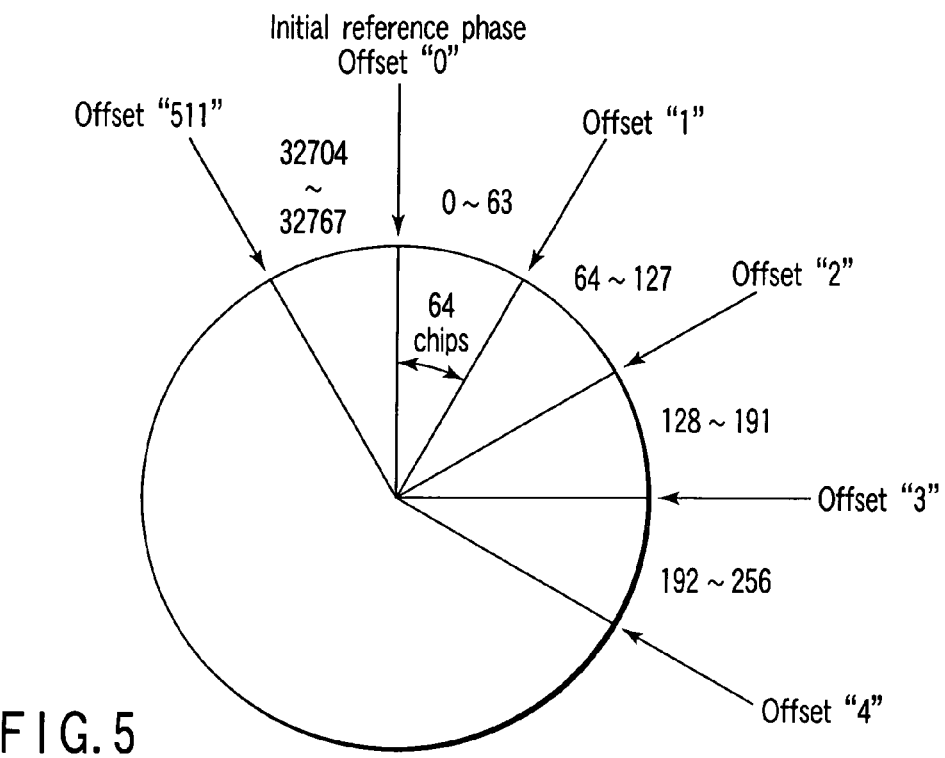
FIG. 5 shows a PN code phase ring of the mobile radio system shown in FIG. 1.

PN offset numbers are assigned to each of the 1x base station 101 and the 1xEV-DO base station 105. FIG. 5 shows a PN code phase ring of the mobile radio system.

In the shown example, 512 PN offsets "0" to "511" are formed by separating PN code lengths "$2^{15}$ chips" (0 to 3276 chips) by 64 chips. Each of the offset numbers is assigned to the 1x base station 101 and the 1xEV-DO base station 105. The same PN offset number is assigned to the 1x base station 101 and the 1xEV-DO base station 105 located in the same shared cell 402.

The mobile radio terminal apparatuses 201 and 202 receive pilot signals transmitted from the respective base stations to conduct PN code searching. In the PN code searching, each of the terminal apparatuses first monitors the intensity of the pilot signals transmitted from the base station while changing the PN offsets, searches for the base station of the greatest pilot signal intensity and confirms PN offset information of the searching. After that, the terminal apparatuses synchronize the system timings on the basis of the SYNC information transmitted from the base stations and the confirmed PN offset information.

Figure 6:
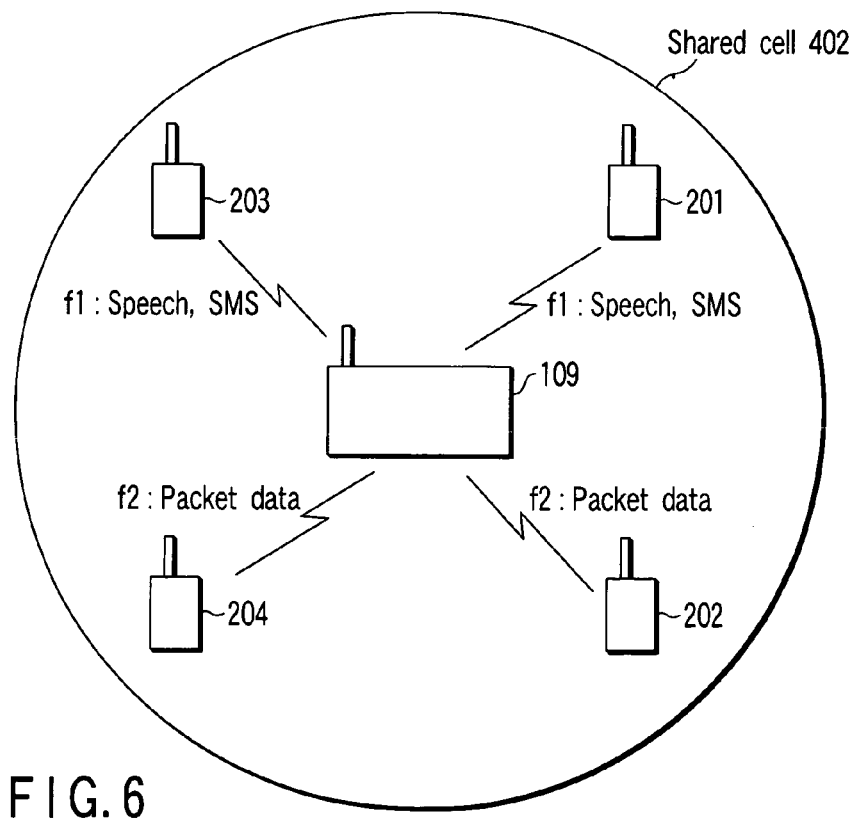
FIG. 6 shows an illustration of a mobile radio system in case where a 1x base station 101 and a 1xEV-DO base station 105 shown in FIG. 1 are combined.

FIG. 6 shows a base station formed by combining the base stations 101 and 105 as a dual base station 109 though FIG. 2 shows the 1x base station 101 and the 1xEV-DO base station 105 that exist separately in the same shared cell 402. The dual base station 109 provides both the 1x service and the 1xEV-DO service. The same PN offset number is assigned to both the services.

In the dual base station 109, both the 1x service and the 1xEV-DO service are synchronized at the same system timing on the basis of the GPS signal and the like. The radio frequency f1 is used for the 1x service and the radio frequency f2 is used for the 1xEV-DO service. There are two kinds of radio frequency f2, i.e. fEV1 and fEV2.

In the 1x service, a radio frequency f1up is used for uploading and a radio frequency f1dw is used for downloading. In the 1xEV-DO service, a radio frequency f2up (fEV1up or fEV2up) is used for uploading and a radio frequency f2dw (fEV1dw or fEV2dw) is used for downloading. In the frequency band of 800 MHz, a difference between the download frequency and the upload frequency is generally set at 45 MHz.

The 1x radio terminal 203 and the mobile radio terminal apparatus 201 make radio communications with the dual base station 109 at the frequency f1 to carry out the speech communication, SMS communication and the like of the 1x service. The 1xEV-DO radio terminal 204 and the mobile radio terminal apparatus 202 make radio communications with the dual base station 109 at the frequency f2 (fEV1 or fEV2) to carry out the packet data communication of the 1xEV-DO service.

Figure 7:
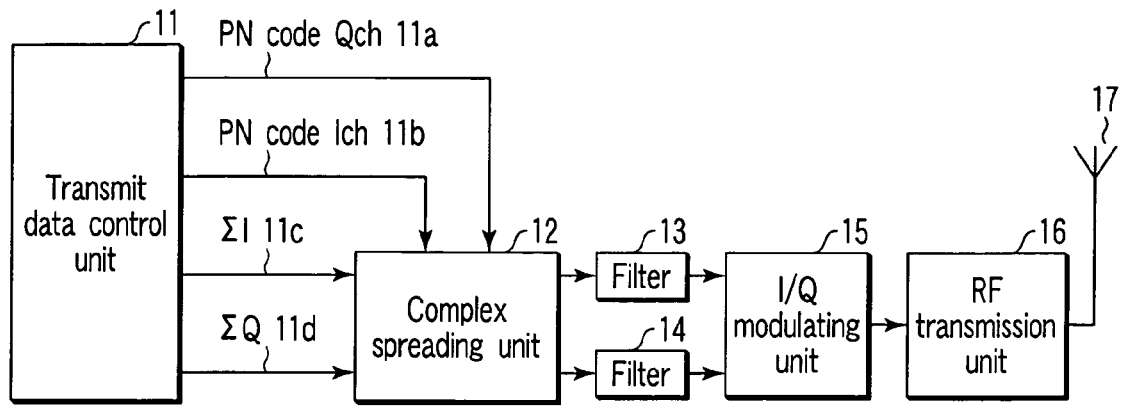
FIG. 7 shows a configuration of a download spread modulation unit in the base station shown in FIG. 6.

FIG. 7 shows a download spread modulation unit of the dual base station 109. The download spread modulation unit generates radio signals of the 1x service and the 1xEV-DO service and transmits them to the mobile stations such as the mobile radio terminal apparatus 201 and the like. In the 1x service and the 1xEV-DO service, the download spread modulation unit is operated at a common system timing.

The download spread modulation unit mainly comprises a transmit data control unit 11, a complex spreading unit 12, a filter 13, a filter 14, an I/Q modulating unit 15, a RF transmission unit 16, and an antenna 17, to transmit the radio signals of the 1x service and the 1xEV-DO service.

The transmit data control unit 11 transmits transmission signals, i.e. $\Sigma I$ signal 11c and $\Sigma Q$ signal 11d, and 1.2288-MHz PN code Ich signal 11b and PN code Qch signal 11a which are both base station PN offsets, to the complex spreading unit 12.

The complex spreading unit 12 processes the $\Sigma I$ signal 11c and the $\Sigma Q$ signal 11d in complex spreading using the PN code Ich signal 11b and the PN code Qch signal 11a. Of the signals obtained from the processing, I signal is output to the filter 13 and Q signal is output to the filter 14.

The filters 13 and 14 process the respectively input signals in digital filtering in a baseband. The processing results are output to the I/Q modulating unit 15.

The I/Q modulating unit 15 process the outputs of the filters 13 and 14 in I/Q modulation and outputs the modulation result to the RF transmission unit 16. The RF transmission unit 16 transmits the input signal via the antenna 17.

The transmit data controlled by the transmit data control unit 11 includes communication control signals such as paging signals, user signals, and the like. As for the paging signals, transmit timing, transmission cycle and incoming call data are controlled by the transmit data control unit 11.

Figure 8:
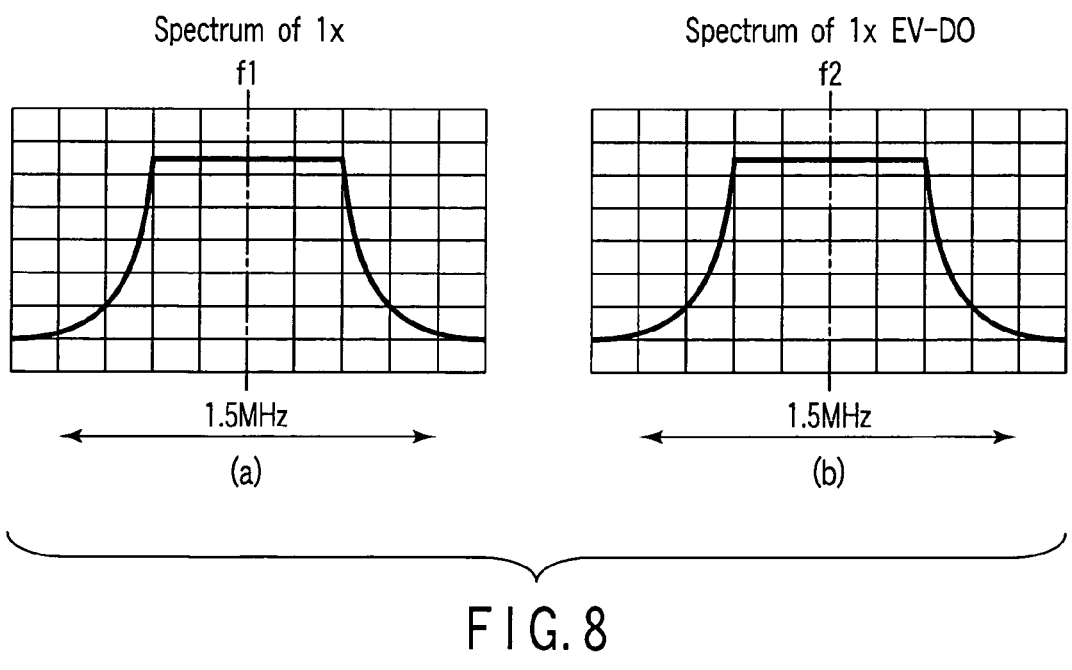
FIG. 8 shows frequency spectrums of radio signals transmitted from the base station shown in FIG. 6.

FIG. 8(a) shows a frequency spectrum of the 1x service radio signal transmitted from the download spread modulation unit shown in FIG. 7. FIG. 8(b) shows a frequency spectrum of the 1xEV-DO service radio signal transmitted from the download spread modulation unit shown in FIG. 7.

The 1x service radio signal and the 1xEV-DO service radio signal show the same spectrum as shown in the figures since they are generated by the download spread modulation unit shown in FIG. 7. For this reason, a cell site (not shown), a tower (not shown) and an antenna (not shown) of the dual base station 109 can be shared for the 1x service and the 1xEV-DO service.

Figure 9:
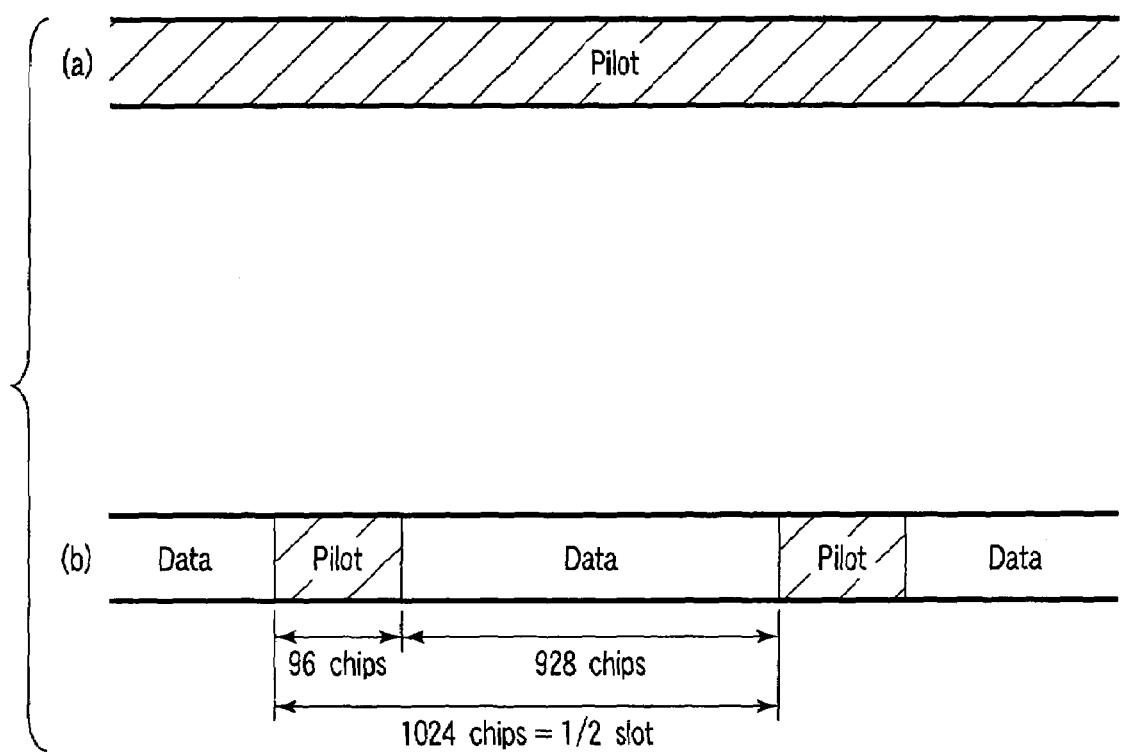
FIG. 9 shows time charts of pilot signals transmitted from the base station of the mobile radio system shown in FIG. 1.

FIG. 9 shows time charts of the pilot signals transmitted from the base station. The 1x service pilot signal is always transmitted continuously as shown in FIG. 9(a). As for the 1xEV-DO service pilot signal, a half slot is formed of 1024 chips as shown in FIG. 9(b). The pilot signal of 96 chips is inserted into 1024 chips similarly to a burst.

In the cell providing the 1x service and the 1xEV-DO service, the system timings of the download signals are the same since the operations of both the services are synchronized with the common system timing of the GPS or the like.

Figure 10:
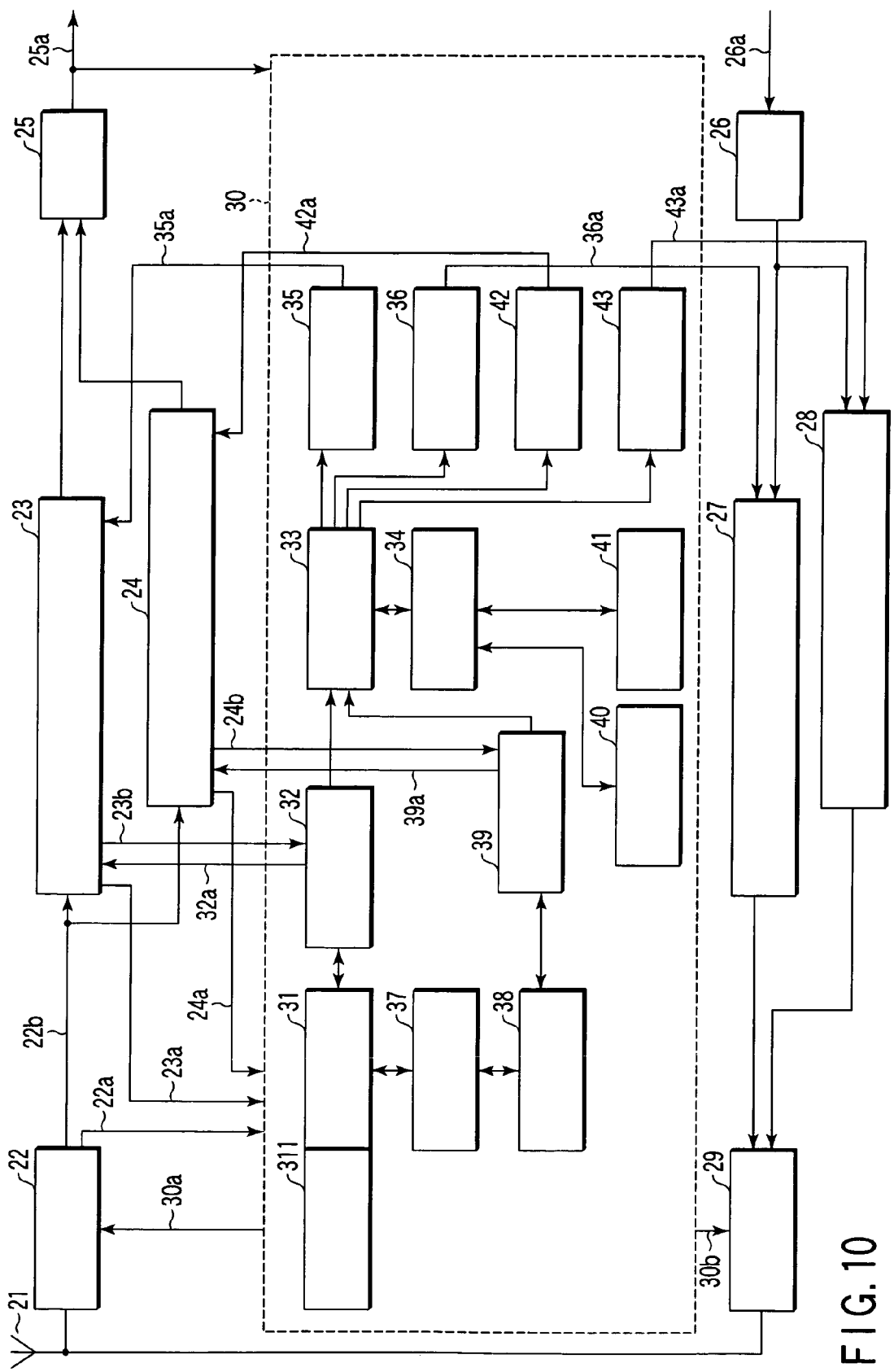
FIG. 10 shows a block diagram of a configuration of the mobile radio terminal apparatus in the mobile radio system shown in FIG. 1.

Next, a configuration of the mobile radio terminal apparatus 201 is explained with reference to a block diagram of FIG. 10. The mobile radio terminal apparatus 201 mainly comprises an antenna 21, a RF receiving unit 22, a 1x RAKE receiving unit 23, a 1xEV-DO RAKE receiving unit 24, a decoding unit 25, an encoding unit 26, a 1x spreading unit 27, a 1xEV-DO spreading unit 28, a RF transmitting unit 29, a control unit 30 and the like.

Each of the 1x RAKE receiving unit 23 and the 1xEV-DO RAKE receiving unit 24 comprises a known searcher, a plurality of fingers, a synthesizer and the like to conduct RAKE reception.

The control unit 30 controls all of the units of the mobile radio terminal apparatus 201. The control unit 30 comprises a 1x cell information database 31, a 1x cell search result database 311, a 1x control unit 32, a common system timing managing unit 33, a common system timing maintaining unit 34, a 1x receive timing setting unit 35, a 1x transmit timing setting unit 36, a common cell information database 37, a 1xEV-DO cell information database 38, a 1xEV-DO control unit 39, a 1x paging counter 40, a 1xEV-DO paging counter 41, a 1xEV-DO receive timing setting unit 42, a 1xEV-DO transmit timing setting unit 43, and the like. The common system timing maintaining unit 34 comprises a counter which counts the system timing.

To receive the 1x service radio signal, the mobile radio terminal apparatus 201 comprises the antenna 21, the RF receiving unit 22, the 1x RAKE receiving unit 23, the decoding unit 25, the 1x cell information database 31, the common cell information database 37, the 1x control unit 32, the common system timing managing unit 33, the common system timing maintaining unit 34, the 1x receive timing setting unit 35, the 1x paging counter 40, and the like.

To receive the 1xEV-DO service radio signal, the mobile radio terminal apparatus 201 comprises the antenna 21, the RF receiving unit 22, the 1xEV-DO RAKE receiving unit 24, the decoding unit 25, the common cell information database 37, the 1xEV-DO cell information database 38, the 1xEV-DO control unit 39, the common system timing managing unit 33, the common system timing maintaining unit 34, the 1xEV-DO receive timing setting unit 42, the 1xEV-DO paging counter 41, and the like.

To transmit the 1x service radio signal, the mobile radio terminal apparatus 201 comprises the antenna 21, the RF transmitting unit 29, the 1x spreading unit 27, the encoding unit 26, the common system timing managing unit 33, the common system timing maintaining unit 34, 1x transmit timing setting unit 36, and the like.

To transmit the 1xEV-DO service radio signal, the mobile radio terminal apparatus 201 comprises the antenna 21, the RF transmitting unit 29, the 1xEV-DO spreading unit 28, the encoding unit 26, the common system timing managing unit 33, the common system timing maintaining unit 34, the 1xEV-DO transmit timing setting unit 43, and the like.

The common system timing managing unit 33, the common system timing maintaining unit 34, and the like function as means for controlling the common system timing of the 1x service and the 1xEV-DO service.

Figure 11:
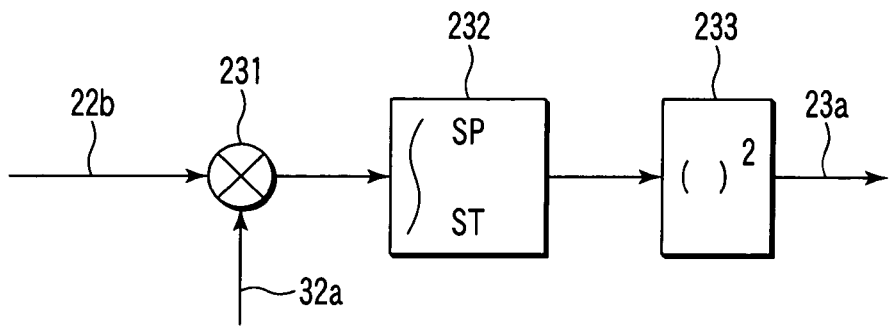
FIG. 11 shows a diagram of a partial configuration of a 1x RAKE receiving unit shown in FIG. 10.

FIG. 11 shows a configuration of an integrating unit of the searcher provided in the 1x RAKE receiving unit 23. The integrating unit comprises a multiplier 231, an integrator 232, a square circuit 233 and the like.

The base station transmits a signal which is subjected to spreading with a predetermined spread code. The transmitted signal is input to one of input terminals of the multiplier 231 via the antenna 21 and the RF receiving unit 22, as a receive signal 22b. A PN code 32a generated in the 1x control unit 32 is input to another input terminal of the multiplier 231.

The multiplier 231 multiplies the receive signal 22b by the PN code 32a and outputs the multiplication result to the integrator 232. The integrator 232 integrates the multiplication result during a preset period from a start point ST to a stop point SP and outputs the integration result to the square circuit 233. The square circuit 233 squares the integration result and outputs the result.

In this configuration, if the spread code used in the base station corresponds to the PN code 32a generated by the 1x control unit 32, 1x cell power 23a can be obtained from the output of the square circuit 233.

The searcher provided in the 1xEV-DO RAKE receiving unit 24 comprises an integrating unit as explained above, similarly to the searcher provided in the 1x RAKE receiving unit 23. Thus, explanation of the searcher provided in the 1xEV-DO RAKE receiving unit 24 is omitted here.

The 1x pilot signal and the 1xEV-DO pilot signal transmitted from the base station are different in transmit timing as shown in FIG. 9. For this reason, the searcher provided in each of the 1x RAKE receiving unit 23 and the 1xEV-DO RAKE receiving unit 24 matches the start point ST and the stop point SP to an expected pilot signal receive timing.

For example, the searcher of the 1x RAKE receiving unit 23 integrates the 1x pilot signal by 128 chips with the integrator 232. The searcher of the 1xEV-DO RAKE receiving unit 24 integrates the 1xEV-DO pilot signal in accordance with the 96-chip portion of the pilot with the integrator.

Figure 12:
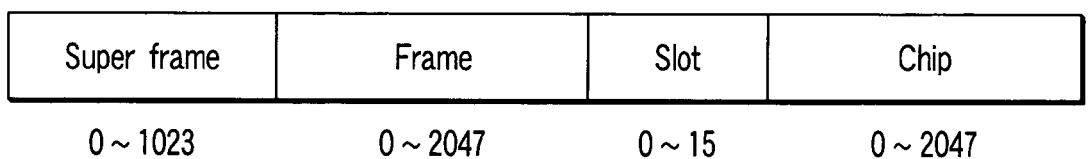
FIG. 12 shows a system timing stored in a common system timing maintaining unit shown in FIG. 10.

The common system timing maintaining unit 34 stores a count value of the system timing as shown in FIG. 12. The unit 34 receives chip clocks and the like and operates synchronously with the chip clocks and the like, to store timings of super frame numbers "0 to 1023", frame numbers "0 to 2047", slot numbers "0 to 15", chip numbers "0 to 2047" and the like.

Next, operations of setting of the frequency, in the mobile radio terminal apparatus 201, will be explained. The frequency control as explained below is arbitrarily executed in accordance with the service to be used.

When the control unit 30 receives the radio signal of the 1x service, the control unit 30 outputs an RF receive control signal 30a to receive the radio signal of the radio frequency f1dw to the RF receiving unit 22. The RF receiving unit 22 receives the radio signal of the radio frequency f1dw by controlling a synthesizer which is built in the terminal apparatus.

When the control unit 30 transmits the radio signal of the 1x service, the control unit 30 outputs an RF transmit control signal 30b to transmit the radio signal of the radio frequency f1up to the RF transmitting unit 29. The RF transmitting unit 29 transmits the radio signal of the radio frequency f1up by controlling the built-in synthesizer.

When the control unit 30 receives the radio signal of the 1xEV-DO service, the control unit 30 outputs the RF receive control signal 30a to receive the radio signal of the radio frequency f2dw (fEV1dw or fEV2dw) to the RF receiving unit 22. The RF receiving unit 22 receives the radio signal of the radio frequency f2dw (fEV1dw or fEV2dw) by controlling the built-in synthesizer.

When the control unit 30 transmits the radio signal of the 1xEV-DO service, the control unit 30 outputs an RF transmit control signal 30b to transmit the radio signal of the radio frequency f2up (fEV1up or fEV2up) to the RF transmitting unit 29. The RF transmitting unit 29 transmits the radio signal of the radio frequency f2up (fEV1up or fEV2up) by controlling the built-in synthesizer.

Next, operations to confirm whether the mobile radio terminal apparatus 201 exists in the 1x service area will be explained.

The radio signals of the radio frequency f1dw transmitted from a plurality of base stations for the 1x service are received in a synthesized state by the antenna 21 and input to the RF receiving unit 22. The RF receiving unit 22 is set by the built-in synthesizer to receive the radio signal of the radio frequency f1dw.

The RF receiving unit 22 detects an RSSI (Received Signal Strength Indicator) signal 22a, of the input radio signal, and outputs this to the control unit 30.

If the RSSI signal 22a is higher than a preset threshold value, the control unit 30 discriminates that the mobile radio terminal apparatus 201 exists in the 1x service area, i.e. that the base stations of the 1x service exist near the mobile radio terminal apparatus 201.

Next, operations of cell search to search for base stations providing the 1x service, in the mobile radio terminal apparatus 201, will be explained.

Different PN codes are assigned to a plurality of base stations for the 1x service. The base stations transmit pilot signals diffused with the assigned PN codes.

When the 1x control unit 32 of the mobile radio terminal apparatus 201 searches for all the cells, the 1x control unit 32 instructs the searcher of the 1x RAKE receiving unit 23 to sequentially use the PN offsets "0" to "511" shown in FIG. 5.

The searcher despreads the receive signal 22b by sequentially using the PN offsets "0" to "511". The results obtained from this processing are sequentially output to the 1x control unit 32 as the 1x cell power signals 23a.

The 1x cell power signals 23a may be the RSCP (Received Signal Code Power) or SIR (ratio of receive signal power to interference signal power) obtained by dividing the RSCP by the interference power.

The 1x control unit 32 monitors the 1x cell power signals 23a and detects the PN offset obtained when the cell power is greatest. The 1x cell to which the detected PN offset is assigned is the 1x cell having the greatest cell power.

On the basis of 1x search result 23b obtained by the searcher, the 1x control unit 32 assigns paths to a plurality of fingers provided in the 1x RAKE receiving unit 23. The fingers thereby follow the multipath of the radio propagation path.

Outputs of the fingers are subjected to RAKE synthesis by a synthesizer provided in the 1x RAKE receiving unit 23. The synthesizer outputs RAKE synthesis data obtained from the RAKE synthesis to the decoding unit 25. The decoding unit 25 processes the RAKE synthesis data in the demodulation and the like to obtain receive data 25a. The receive data 25a is transmitted to the control unit 30, data processing units of subsequent steps and the like.

Next, operations of system timing synchronization for the 1x service, in the mobile radio terminal apparatus 201, will be explained.

The receive data 25a obtained by decoding the signal received from the 1x cell having the maximum cell power by the decoding unit 25 is output to the control unit 30. The receive data 25a includes SYNC information.

The control unit 30 detects the system timing, on the basis of both timing information included in the SYNC information and the PN offset of the 1x cell having the maximum cell power. The control unit 30 allows the detected system timing to be stored in the system timing counter provided in the common-system timing maintaining unit 34.

The common system timing managing unit 33 sets the timing for the 1x receive timing setting unit 35, on the basis of the system timing stored in the common system timing maintaining unit 34. The 1x receive timing setting unit 35 designates the timing in the 1x RAKE receiving unit 23, on the basis of the timing which is set by the common system timing managing unit 33.

Thus, when the system is established, the 1x cell having the maximum cell power becomes the 1x serving cell which makes communication with the mobile radio terminal apparatus 201, i.e. a 1x active cell.

Next, operations of standby processing of the 1x service, in the mobile radio terminal apparatus 201, will be explained.

The 1x serving cell transmits the 1x paging signal with a timing synchronized with the system timing or, for example, in a cycle of 5.12 seconds.

The mobile radio terminal apparatus 201 becomes wake-up state in accordance with the transmission of the 1x paging signal from the 1x serving cell or, for example, in a cycle of 5.12 seconds, and performs intermittent reception, for the battery saving.

The units which are always operated for the standby processing of the 1x service are the common system timing maintaining unit 34 and the 1x paging counter 40. The 1x paging counter 40 stores the timing of the intermittent operation.

The 1x paging signal is transmitted from the 1x serving cell on the basis of the timing stored in the 1x paging counter 40. In accordance with the transmission, the control unit 30 wakes up the main units of the mobile radio terminal apparatus 201. When the processing during the wake-up is ended, the control unit 30 becomes a sleep state to wait for a next intermittent operation timing to come.

The processing during the wake-up includes the standby processing of an incoming call for the mobile radio terminal apparatus 201 transmitted from the 1x serving cell. The incoming call signal is decoded by the antenna 21, the RF receiving unit 22, the 1x RAKE receiving unit 23 and the decoding unit 25. The receive data 25a obtained by the decoding is output to the control unit 30. The control unit 30 confirms whether the incoming call for the mobile radio terminal apparatus 201 has been made, on the basis of the receive data 25a.

The processing during the wake-up also includes 1x cell search prepared for cell re-selection. In this processing, the control unit 30 detects 1x neighbor cell information included in the signal transmitted from the 1x serving cell.

The control unit 30 stores the 1x neighbor cell information in the 1x cell information database 31. The 1x control unit 32 performs the cell search, on the basis of the 1x neighbor cell information stored in the 1x cell information database 31. Results of the cell search are stored in the 1x cell search result database 311, in order of cell power.

Next, operations to confirm whether the mobile radio terminal apparatus 201 exists in the 1xEV-DO service area will be explained.

The radio signals of the radio frequency f2dw transmitted from a plurality of base stations for the 1xEV-DO service are received in the synthesized state by the antenna 21, and input to the RF receiving unit 22. The RF receiving unit 22 is set by the built-in synthesizer to receive the radio signal of the radio frequency f2dw (fEV1dw or fEV2dw).

The RF receiving unit 22 detects the RSSI (Received Signal Strength Indicator) signal 22a, of the input radio signal, and outputs this to the control unit 30.

If the RSSI signal 22a is higher than a preset threshold value, the control unit 30 discriminates that the mobile radio terminal apparatus 201 exists in the 1xEV-DO service area, i.e. that the base stations of the 1xEV-DO service exist near the mobile radio terminal apparatus 201.

Next, operations of system timing synchronization for the 1xEV-DO service, in the mobile radio terminal apparatus 201, will be explained.

When reception of the 1x service is performed prior to the reception of the 1xEV-DO service, the 1x system timing has already been stored in the system timing counter provided in the common system timing maintaining unit 34.

Since the system timings of the 1x service and the 1xEV-DO service are synchronized with the GPS, the system timings of the downstream pilot signals for both the services are the same. Therefore, after the reception of the 1x service is performed, the 1x system timing stored in the system timing counter provided in the common system timing maintaining unit 34 may be applied to the reception of the 1xEV-DO service and the system timing of the 1xEV-DO service does not need to be newly established.

The common system timing managing unit 33 sets the timing for the 1xEV-DO receive timing setting unit 42, on the basis of the system timing stored in the common system timing maintaining unit 34. The 1xEV-DO receive timing setting unit 42 designates the timing in the 1xEV-DO RAKE receiving unit 24, on the basis of the timing which is set by the common system timing managing unit 33.

Next, operations of cell search to search for base stations providing the 1xEV-DO service, in the mobile radio terminal apparatus 201, will be explained.

Different PN codes are assigned to a plurality of base stations for the 1xEV-DO service. The base stations transmit pilot signals diffused with the assigned PN codes.

Results of the 1x cell search are stored in the 1x cell search result database 311 in order of 1x cell power, by the paging of the 1x service reception which is performed together with the 1xEV-DO service reception.

On the basis of the information stored in the 1x cell search result database 311, the 1xEV-DO control unit 39 sets the PN offsets in order of 1x cell power in the 1xEV-DO RAKE receiving unit 24 to perform the 1xEV-DO cell search.

The 1xEV-DO control unit 39 selects the 1xEV-DO cell from which the maximum 1xEV-DO cell power can be obtained, on the basis of 1xEV-DO cell power 24a which is obtained by the 1xEV-DO RAKE receiving unit 24. The 1xEV-DO cell from which the maximum 1xEV-DO cell power can be obtained, becomes a 1xEV-DO serving cell which makes communication with the mobile radio terminal apparatus 201.

Next, operations of standby processing of the 1xEV-DO service, in the mobile radio terminal apparatus 201, will be explained.

The 1x serving cell transmits the 1xEV-DO paging signal with a timing synchronized with the system timing or, for example, in a cycle of 5.12 seconds.

The mobile radio terminal apparatus 201 becomes wake-up state in a cycle that is a natural number's multiple of the cycle of the transmission of the 1xEV-DO paging signal from the 1xEV-DO serving cell, for example, in a cycle of 20.48 seconds that is a quadruple of the transmission cycle, and performs intermittent reception, for the battery saving.

The units which are always operated for the standby processing of the 1xEV-DO service are the common system timing maintaining unit 34 and the 1xEV-DO paging counter 41. The 1xEV-DO paging counter 41 stores the timing of the intermittent operation, i.e. the timing of the cycle of 20.48 seconds that is a natural number's multiple, for example, a quadruple of the cycle of arrival of the 1xEV-DO paging signal.

The 1xEV-DO paging signal is transmitted from the 1xEV-DO serving cell on the basis of the timing stored in the 1xEV-DO paging counter 41. In accordance with the transmission, the control unit 30 wakes up the main units of the mobile radio terminal apparatus 201. When the processing during the wake-up is ended, the control unit 30 becomes a sleep state to wait for a next intermittent operation timing to come.

The processing during the wake-up includes the standby processing of an incoming call for the mobile radio terminal apparatus 201 transmitted from the 1xEV-DO serving cell. The incoming call signal is decoded by the antenna 21, the RF receiving unit 22, the 1xEV-DO RAKE receiving unit 24 and the decoding unit 25. The receive data 25*a* obtained by the decoding is output to the control unit 30. The control unit 30 confirms whether the incoming call for the mobile radio terminal apparatus 201 has been made, on the basis of the receive data 25*a*.

The processing during the wake-up also includes 1xEV-DO cell search prepared for cell re-selection. In this processing, the control unit 30 detects 1xEV-DO neighbor cell information included in the signal transmitted from the 1xEV-DO serving cell.

The control unit 30 stores the 1xEV-DO neighbor cell information in the 1xEV-DO cell information database 38. On the basis of the 1xEV-DO neighbor cell information stored in the 1xEV-DO cell information database 38, the 1xEV-DO control unit 39 performs the cell search and measures the 1xEV-DO cell power.

Operations of transmission of the 1x service, in the mobile radio terminal apparatus 201, will be explained.

Transmit data 26*a* generated by a signal processing unit (not shown) is subjected to encoding and the like by the encoding unit 26. The encoding unit 26 transmits the encoded data to the 1x spreading unit 27.

The common system timing managing unit 33 instructs the transmit timing to the 1x transmit timing setting unit 36, on the basis of the system timing stored in the common system timing maintaining unit 34. The 1x transmit timing setting unit 36 outputs timing information 36*a* instructed by the common system-timing managing unit 33 to the 1x spreading unit 27.

The 1x spreading unit 27 processes the data input from the encoding unit 26 in the spreading and the like, with the timing instructed by the 1x transmit timing setting unit 36. The processing result is output to the RF transmitting unit 29. The RF transmitting unit 29 processes the input data in the D/A-conversion, radio processing such as up-converting, and the like and transmits the data to the base station via the antenna 21.

Operations of transmission of the 1xEV-DO service, in the mobile radio terminal apparatus 201, will be explained.

The transmit data 26*a* generated by a signal processing unit (not shown) is subjected to encoding and the like by the encoding unit 26. The encoding unit 26 transmits the encoded data to the 1xEV-DO spreading unit 28.

The common system timing managing unit 33 instructs the transmit timing to the 1xEV-DO transmit timing setting unit 43, on the basis of the system timing stored in the common system timing maintaining unit 34. The 1xEV-DO transmit timing setting unit 43 outputs timing information 43*a* instructed by the common system timing managing unit 33 to the 1xEV-DO spreading unit 28.

The 1xEV-DO spreading unit 28 processes the data input from the encoding unit 26 in the spreading and the like, with the timing instructed by the 1xEV-DO transmit timing setting unit 43. The processing result is output to the RF transmitting unit 29. The RF transmitting unit 29 processes the input data in the D/A-conversion, radio processing such as up-converting, and the like and transmits the data to the base station via the antenna 21.

Figure 13:
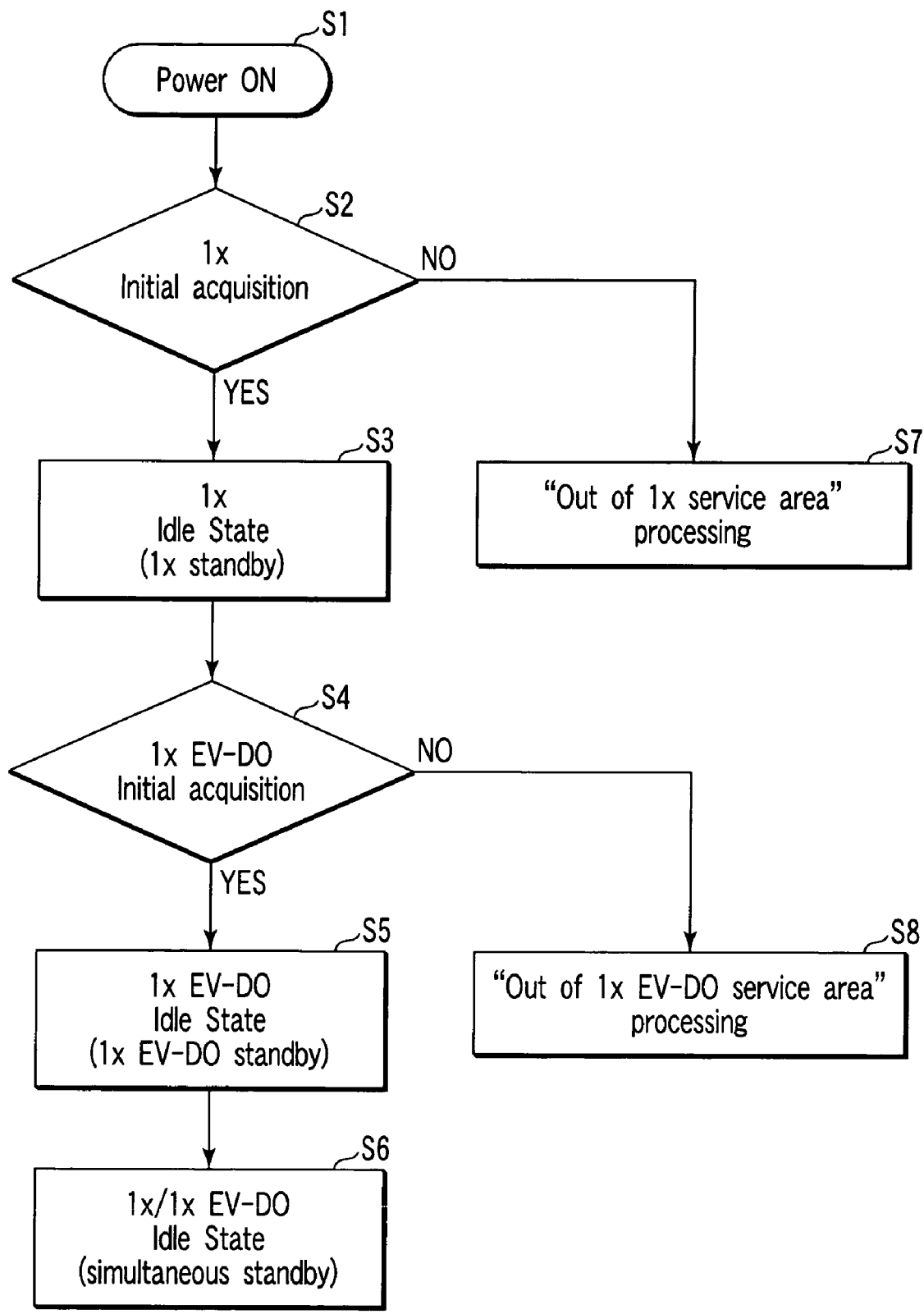
FIG. 13 shows a flowchart of control operations executed by a control unit shown in FIG. 10.

FIG. 13 is a flowchart of the operations of the control unit 30 in the mobile radio terminal apparatus 201. The flowchart shows an initial operation after the power of the mobile radio terminal apparatus 201 is turned ON, to an operation of standing by both the 1x service and the 1xEV-DO service.

When the power is turned on (step Si), the control unit 30 performs 1x initial acquisition such as measurement of the RSSI of the radio signal for the 1x service, 1x cell search, establishment of the 1x system timing and the like to connect to the 1x service cell (step S2).

If the 1x initial acquisition has been completed in step S2, the operation shifts to step S3 and the control unit 30 becomes 1x Idle State (1x standby) with the 1x serving cell acquired in the 1x initial acquisition of step S2.

In step S3, the control unit 30 stands by an incoming call for the mobile radio terminal apparatus 201 which is to be transmitted from the 1x serving cell. The control unit 30 also performs 1x cell search, in preparation for cell re-selection. These processings are executed by intermittent operation in which the 1x serving cell becomes wake-up state in a cycle of, for example, 5.12 seconds, for battery saving.

The 1x Idle State (step S3) continues after step S3 and the operation shifts to S4.

In step S4, the control unit 30 performs 1xEV-DO initial acquisition such as measurement of the RSSI of the radio signal for the 1xEV-DO service, 1xEV-DO cell search, establishment of the 1xEV-DO system timing and the like to connect to the 1xEV-DO service cell, simultaneously with the 1x Idle State of step S3.

If the 1xEV-DO initial acquisition has been completed in step S4, the operation shifts to step S5 and the control unit 30 becomes 1xEV-DO Idle State (1x standby) with the 1xEV-DO serving cell acquired in the 1xEV-DO initial acquisition of step S4.

In step S5, the control unit 30 stands by an incoming call for the mobile radio terminal apparatus 201 which is to be transmitted from the 1xEV-DO serving cell. The control unit 30 also performs 1xEV-DO cell search, in preparation for cell re-selection. These processings are executed by intermittent operation in which the 1xEV-DO serving cell becomes wake-up state in a cycle of, for example, 20.48 seconds that is a natural number's multiple of 5.12 seconds, for battery saving.

The 1xEV-DO Idle State is executed simultaneously with the 1x Idle State that has been started in step S3. The control unit 30 becomes 1/1xEV-DO Idle State (simultaneous standby) to stand by both the 1x service and the 1xEV-DO service (step S6=S3+S5).

If the 1x initial acquisition has not been completed in step S2, the control unit 30 shifts to step S7. In step S7, the control unit 30 executes "out of 1x service area" processing.

In the "out of 1x service area" processing, the control unit 30 executes the 1x initial acquisition again by considering that the user of the mobile radio terminal apparatus may move into the service area 1x. The 1x initial acquisition in the "out of 1x service area" processing is executed by intermittent operation in which the 1x serving cell becomes the wake-up state in a cycle of some seconds for the battery saving.

If the 1xEV-DO initial acquisition has not been completed in step S4, the control unit 30 shifts to step S8. In step S8, the control unit 30 executes "out of 1xEV-DO service area" processing.

In the "out of 1xEV-DO service area" processing, the control unit 30 executes the 1xEV-DO initial acquisition again by considering that the user of the mobile radio terminal apparatus may move into the service area 1xEV-DO. The 1xEV-DO initial acquisition in the "out of 1xEV-DO service area" processing is executed by intermittent operation in which the 1x serving cell becomes the wake-up state in a cycle of some seconds for the battery saving.

If the 1x initial acquisition cannot be executed but the "out of 1x service area" processing continues in step S7, this means that the mobile radio terminal apparatus 201 does not exist in the 1x cell 401 or the shared cell 402 shown in FIG. 3.

If the 1x initial acquisition cannot be executed in step S2, the control unit 30 shifts to step S7 and does not execute the "out of 1xEV-DO service area" processing (step S8). The battery power spent for the "out of 1xEV-DO service area" processing can be therefore saved.

Figure 14:
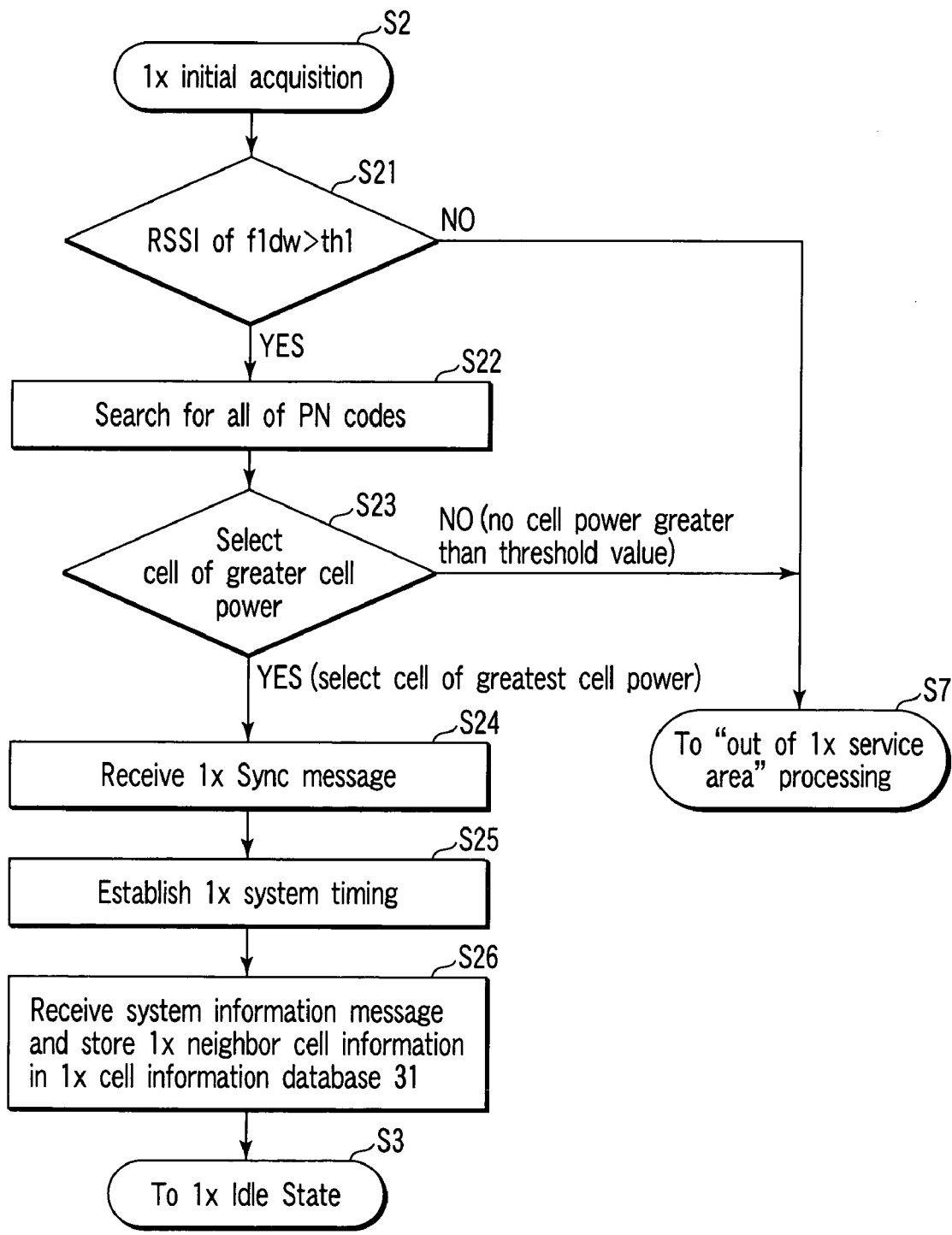
FIG. 14 shows a flowchart of 1x initial acquisition shown in FIG. 13.

The 1x initial acquisition (step S2) shown in FIG. 13 will be explained. FIG. 14 is a flowchart showing the 1x initial acquisition executed by the control unit 30.

If the mobile radio terminal apparatus 201 is turned on, the control unit 30 receives the radio signal of the radio frequency f1dw and measures the RSSI of the received signal in step S21. Therefore, the signals transmitted from a plurality of 1x base stations are received in the synthesized state, and the strength of the synthesized signals is measured.

If the RSSI is equal to or smaller than threshold value th1, the control unit 30 shifts to the "out of 1x service area" processing (step S7). If the RSSI is greater than the threshold value th1, the control unit 30 shifts to search for all the PN codes (step S22).

The control unit 30 executes the 1x cell search in step S22 and shifts to step S23. In the 1x cell search, the control unit 30 measures the powers (cell powers) of the signals received from a plurality of 1x base stations (cells). Then, the control unit 30 specifies the PN offset on the basis of the measurement result.

The 1x cell search requires much time since it is necessary to search for all of the PN offsets "0" to "511" and confirm the 1x cell powers.

In step S23, if there are one or more cells having the cell powers greater than the threshold value, of the cell powers measured by the 1x cell search executed in step S22, the control unit 30 selects the cell having the greatest cell power and shifts to step S24. If there is no cell having the cell power greater than the threshold value, in the 1x cell search, the control unit 30 shifts to the "out of 1x service area" processing.

The control unit 30 receives a Sync message of the 1x service transmitted from the sell selected in step S23, in step S24, and shifts to step S25.

The control unit 30 detects the system timing from the Sync message and establishes synchronization with the 1x base station on the basis of the detected system timing, in step S25, and shifts to step S26. The detected system timing is stored in the system timing counter provided inside the common system timing maintaining unit 34.

The cell selected in step S23 thereby becomes the 1x serving cell (1x active cell). After that, the control unit 30 controls the 1x RAKE receiving unit 23 and the 1x spreading unit 27 to execute transmission and reception, on the basis of the detected system timing.

In step S26, the control unit 30 receives a system information message transmitted from the 1x serving cell. The system information message includes a 1x neighbor cell list as information of cells (1x neighbor cells) located in the vicinity of the 1x serving cell.

The 1x neighbor cell list includes PN offset information used by the 1x neighbor cells. The control unit 30 detects the PN offset information in the 1x neighbor cell list, stores the information in the 1x cell information database 31, and shifts to step S3.

Figure 15:
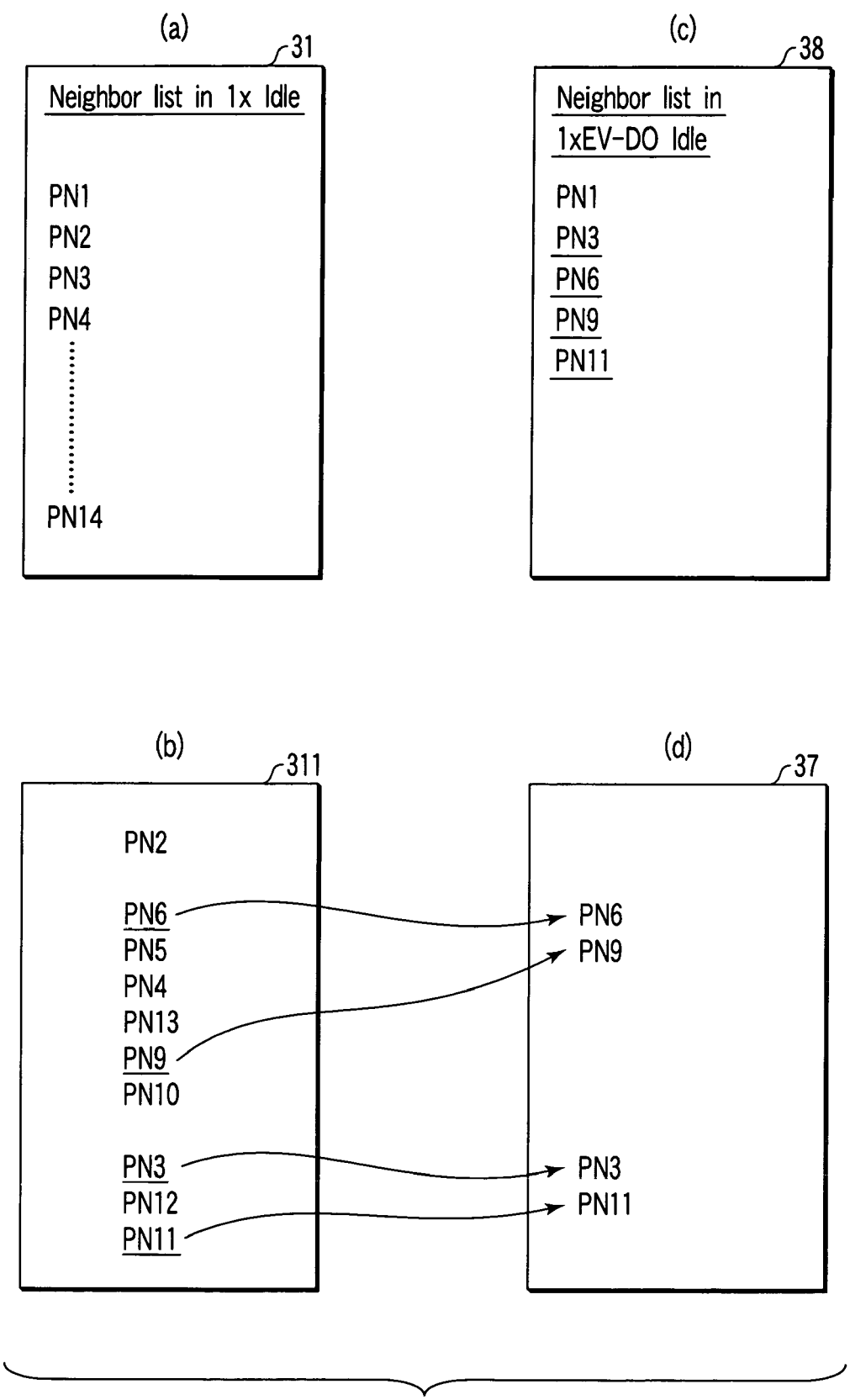
FIG. 15 shows examples of information stored in databases provided inside the control unit shown in FIG. 10.

FIG. 15 illustrates data stored in the databases 31, 37, 38 and 311. FIG. 15(a) shows the 1x cell information database 31, which stores the 1x neighbor cell list. The 1x neighbor cell list includes information of the 1x serving cell (1x active cell) which is currently in communication.

Figure 16:
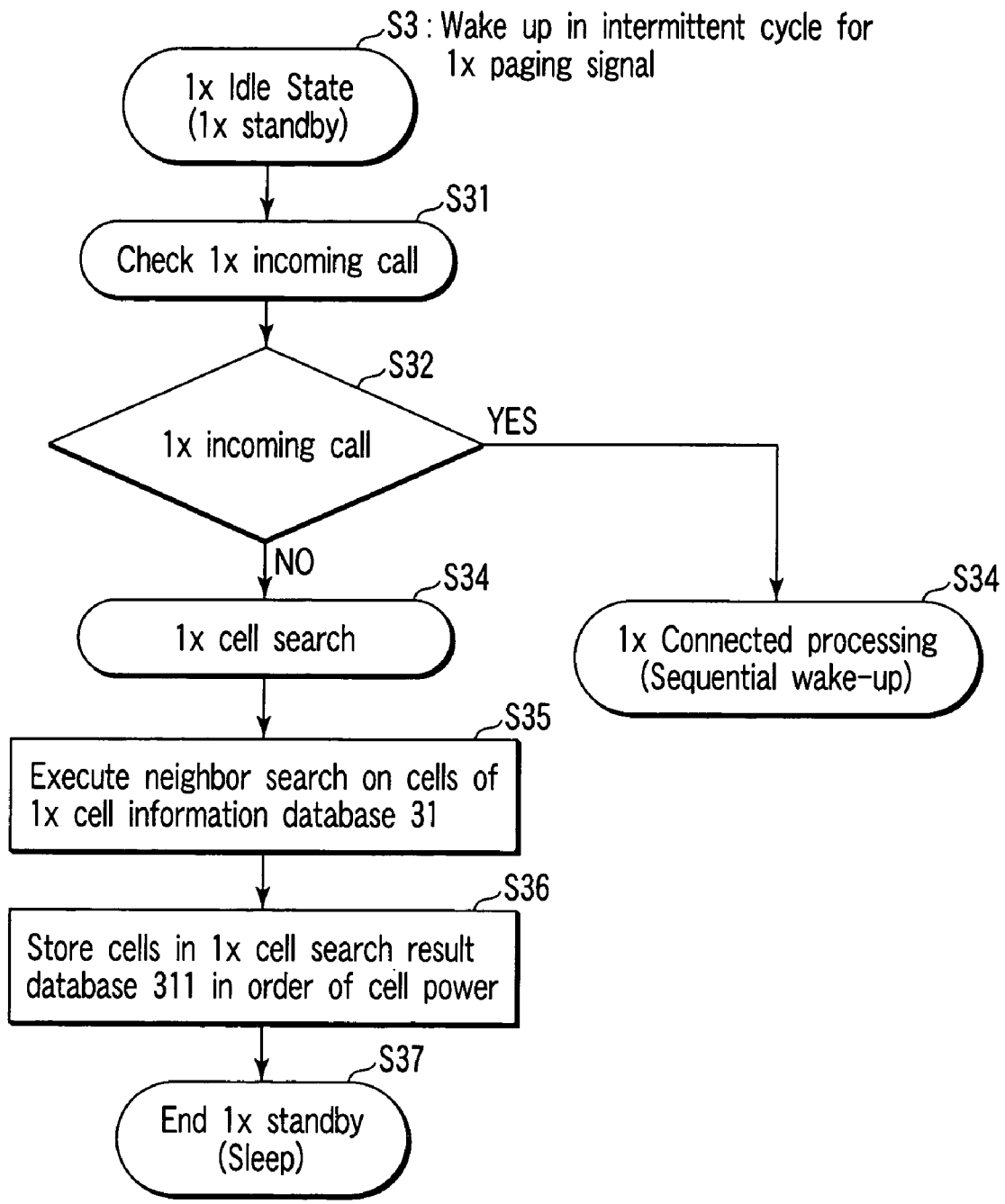
FIG. 16 shows a flowchart of operations of 1x Idle State shown in FIG. 13.

The 1x Idle State (step S3) shown in FIG. 13 will be explained. FIG. 16 is a flowchart of the 1x Idle State executed by the control unit 30. The processing shown in the figure becomes wake-up state in, for example, 5.12 seconds and is repeated intermittently.

First, the control unit 30 checks an incoming call for the 1x service from the 1x serving cell (1x active cell), in step S31, and shifts to step S32.

In step S32, the control unit 30 shifts to step S33 if an incoming call exists. In step S33, the control unit 30 executes 1x Connected processing, sequentially wakes up and starts communication of speech and the like. If no incoming call exists in step S32, the control unit 30 shifts to step S34.

In step S34, the control unit 30 executes 1x neighbor cell search to correspond to the cell re-selection. At the 1x initial acquisition, the 1x neighbor cell information has been stored in the 1x cell information database 31 as shown in FIG. 15(a). In this step, too, the control unit 30 receives the system information message transmitted from the 1x serving cell (1x active cell) by considering the cell re-selection, updates the information stored in the 1x cell information database 31, and shifts to step S35.

In step S35, the control unit 30 executes the 1x neighbor cell search. In the 1x neighbor cell search, the control unit 30 searches for the cells of the 1x neighbor cell information stored in the 1x cell information database 31, and measures the cell powers on the basis of the signals received from the cells. When the control unit 30 has ended the measurement, the control unit 30 shifts to step S36.

In step S36, the control unit 30 stores the PN offsets of the respective cells in the 1x cell search result database 311 in order of measurement of the cell powers, and shifts to step S37. The information thus stored is shown in FIG. 15(b).

The control unit 30 ends the 1x standby processing for one wake-up and becomes sleep state. After that, the operations of steps S31 to S37 are intermittently repeated.

Figure 17:
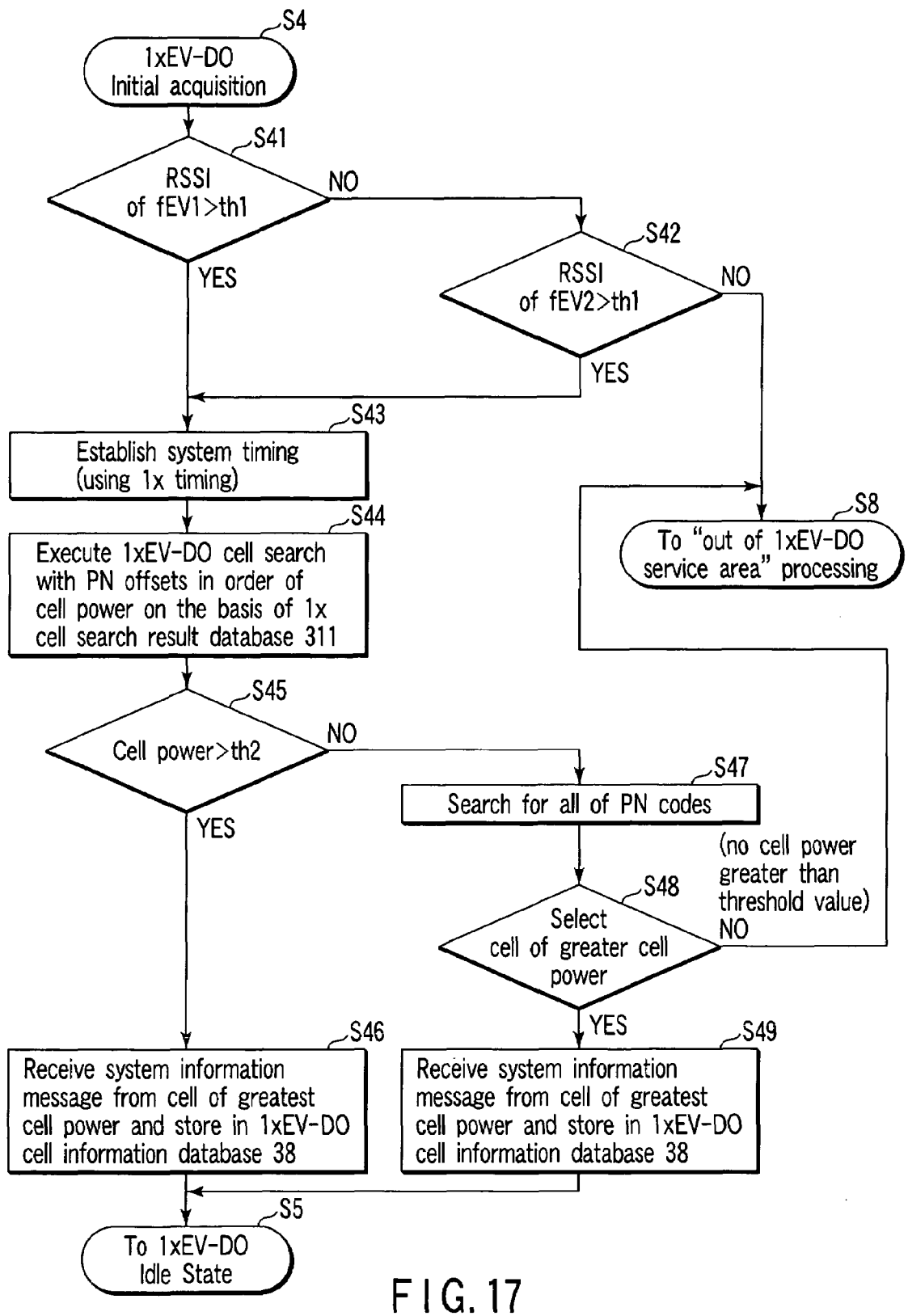
FIG. 17 shows a flowchart of operations of 1xEV-DO initial acquisition shown in FIG. 13.

The 1xEV-DO initial acquisition (step S4) shown in FIG. 13 will be explained. FIG. 17 is a flowchart of the operations of the 1xEV-DO initial acquisition executed by the control unit 30. These operations are executed simultaneously with the 1x Idle State (step S3) shown in FIG. 16.

First, in step S41, the control unit 30 receives the radio signal of the frequency fEV1dw, of the frequency f2dw, and measures the RSSI of the received signal. Thus, the signals transmitted from a plurality of 1xEV-DO base stations are received in the synthesized state and the strength of the signals in the synthesized state is measured.

If the strength of the radio signal of the frequency fEV1dw is equal to or smaller than the threshold value th1, the control unit 30 shifts to step S42. If the strength of the radio signal is greater than the threshold value th1, the control unit 30 shifts to step S43.

In step S42, the control unit 30 receives the radio signal of the frequency fEV2dw, of the frequency f2dw, and measures the RSSI of the received signal. Thus, the signals transmitted from a plurality of 1xEV-DO base stations are received in the synthesized state and the strength of the signals in the synthesized state is measured.

If the strength of the radio signal of the frequency fEV2dw is equal to or smaller than the threshold value th1, the control unit 30 shifts to step S8. If the strength of the radio signal is greater than the threshold value th1, the control unit 30 shifts to step S43.

In step S43, the control unit 30 establishes synchronization with the 1xEV-DO base station and shifts to step S44. The system timings of the 1x service and the 1xEV-DO service are synchronized with the GPS, and the system timing of the downstream pilot signal is the same.

For this reason, the 1x system timing stored in the system timing counter provided in the common system timing maintaining unit 34 in step S25 is applied to establish synchronization with the 1xEV-DO base station.

Thus, the establishment of the system timing for the 1xEV-DO service can be accelerated and the reliability in the establishment of the timing can be improved. After that, the control unit 30 controls the 1xEV-DO RAKE receiving unit 24 and the 1xEV-DO spreading unit 28 to execute transmission and reception, on the basis of the detected system timing.

In step S44, the control unit 30 searches for the cell which provides the 1xEV-DO service. The base station providing the 1xEV-DO service is the shared cell 402 as shown in FIG. 3 and definitely provides the 1x service, too. The 1x service and the 1xEV-DO service in the shared cell 402 are the same PN offset.

The cell for the 1x service which does not provide 1xEV-DO service also exists similarly to the 1x cell 401 of FIG. 3. At this time, however, the 1x cell of a great cell power existing around the mobile radio terminal apparatus 201 is detected by the 1x neighbor cell search of step S35.

For this reason, in step S44, the cell search is executed on the basis of the information (FIG. 15(b)) stored in the 1x cell search result database 311 in step S36. The PN offsets of the cells are stored in order of cell power, in the 1x cell search result database 311.

The control unit 30 executes the cell search for the 1xEV-DO service, about number n of upper PN offsets in order of cell power, of the PN offsets stored in the 1x cell search result database 311, and shifts to step S45.

The control unit 30 can thereby execute the cell search of the 1xEV-DO service without searching for all the cells.

For example, it is assumed that one of data item of the 1x cell search result database 311 would be PN offset "3". In this case, the PN code phase ring shown in FIG. 5 may be searched in the search window length about the timing of PN offset "3".

Figure 18:
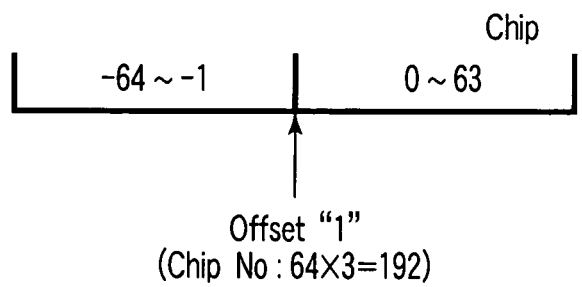
FIG. 18 shows an example of a window length to be searched by the processing shown in FIG. 17.

If the search window length is 128 chips, the search of 128 chips only needs to be executed as shown in FIG. 18. Therefore, the search time can be remarkably reduced.

In step S45, the control unit 30 discriminates whether the cell having a greater cell power than the threshold value th2 has been found by the cell search of step S44. If the cell having a greater cell power than the threshold value th2 has been found, the control unit 30 shifts to step S46. If such a cell has not been found, the control unit 30 shifts to step S47.

In step S46, the control unit.30 regards the 1xEV-DO cell having the greatest cell power as the 1xEV-DO serving cell (1xEV-DO active cell). The control unit 30 receives the system information message such as the sector parameter transmitted from the 1xEV-DO serving cell.

The 1xEV-DO neighbor cell list is included in the system information message as the information of the cells neighboring the 1xEV-DO serving cell. The information of the 1xEV-DO serving cell that is currently in communication is also included in the 1xEV-DO neighbor cell list.

Moreover, the PN offset information of the 1xEV-DO neighbor cell is also included in the 1xEV-DO neighbor cell list. The control unit 30 stores the 1xEV-DO neighbor cell list in the 1xEV-DO cell information database 38 as shown in FIG. 15(c), and shifts to step S5.

In step S47, the control unit 30 searches for all the cells by sequentially using the PN codes of all the cells that provide the 1xEV-DO service, and shifts to step S48. Much time is spent in this step.

In step S48, if the control unit 30 finds one or more of cells whose cell powers are equal to or greater than the threshold value, of the cell powers measured by the cell search executed in step S47, the control unit 30 selects the cell having the greatest cell power and shifts to step S49. If there is no cell whose cell power is equal to or greater than the threshold value, the control unit 30 shifts to the "out of 1xEV-DO service area" processing (step S8).

In step S49, the control unit 30 regards the selected cell as the 1xEV-DO serving cell (1xEV-DO active cell) and receives the system information message from the cell.

The 1xEV-DO neighbor cell list is included in the system information message as the information of the cells neighboring the 1xEV-DO serving cell. The information of the 1xEV-DO serving cell that is currently in communication is also included in the 1xEV-DO neighbor cell list.

Moreover, the PN offset information of the 1xEV-DO neighbor cell is also included in the 1xEV-DO neighbor cell list. The control unit 30 stores the 1xEV-DO neighbor cell list in the 1xEV-DO cell information database 38 as shown in FIG. 15(c), and shifts to step S5.

As described above, in the 1xEV-DO initial acquisition, the cells are searched in decreasing order of cell power, on the basis of the search result of the 1x neighbor cell search executed in the 1x Idle State.

Therefore, since the cell search using a number of PN codes as executed in step S22 of the 1x initial acquisition is not executed, but the search result of the 1x Idle State is used, the time required for the search can be saved. The battery consumption required for the operations of the 1xEV-DO initial acquisition can be thereby reduced. In addition, the configuration can be simplified by removing redundant hardware elements.

Figure 19:
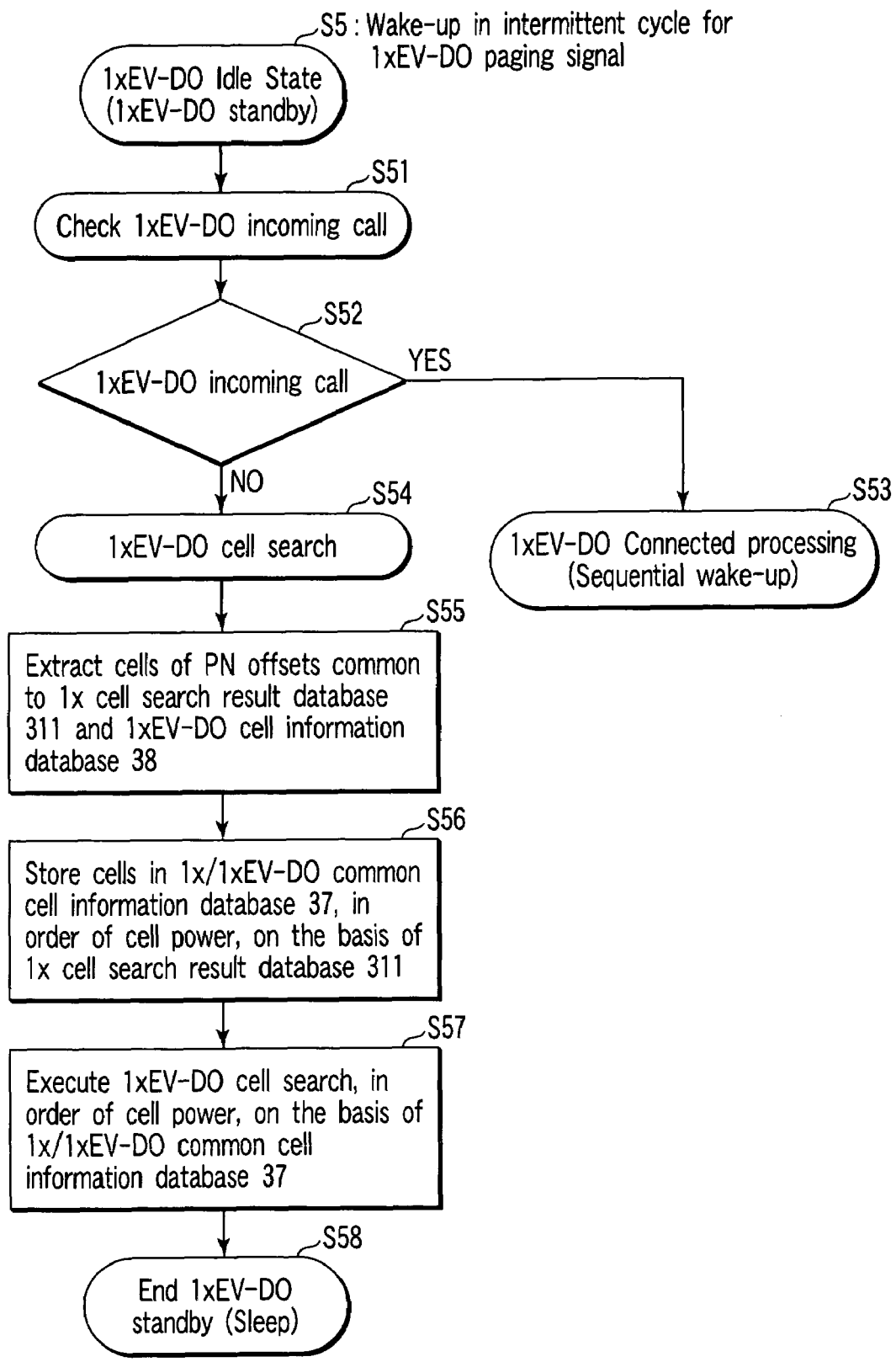
FIG. 19 shows a flowchart of operations of 1xEV-DO Idle State shown in FIG. 13.

The operations of the 1xEV-DO Idle State (step S5) shown in FIG. 13 will be explained. FIG. 19 is a flowchart of the 1xEV-DO Idle State executed by the control unit 30.

These operations are executed simultaneously with the 1x Idle State (step S3) shown in FIG. 16. The processing shown in the figure is intermittently repeated in the wake-up state, for example, in the cycle of 5.12 seconds or 20.48 seconds that is a natural number's multiple of 5.12 seconds.

First, the control unit 30 checks an incoming call for the 1xEV-DO service from the 1xEV-DO serving cell (1xEV-DO active cell), in step S51, and shifts to step S52.

In step S52, the control unit 30 shifts to step S53 if an incoming call exists. In step S53, the control unit 30 executes 1xEV-DO Connected processing, sequentially wakes up and starts reception of packet data. If no incoming call exists in step S52, the control unit 30 shifts to step S54.

In step S54, the control unit 30 executes 1xEV-DO neighbor cell search to correspond to the cell re-selection. At the 1xEV-DO initial acquisition, the 1xEV-DO cell information database 38 has stored the 1x neighbor cell information as shown in FIG. 15(c). In this step, too, the control unit 30 receives the system information message transmitted from the 1xEV-DO serving cell (1xEV-DO active cell) by considering the cell re-selection, updates the information stored in the 1xEV-DO cell information database 31, and shifts to step S55.

In step S55, the control unit 30 detects the cells of the PN offsets commonly stored in the 1x cell search result database 311 and the 1xEV-DO cell information database 38, and shifts to step S56.

The search result of the 1x neighbor cell search (step S34) executed simultaneously with the 1xEV-DO neighbor cell search is stored in the 1x cell search result database 311. The information of the 1xEV-DO cell neighboring the 1xEV-DO serving cell is stored in the 1xEV-DO cell information database 38.

In step S56, the control unit 30 stores the cells detected in step S55 in decreasing order of cell power, in the 1/1xEV-DO common cell information database 37, and shifts to step S57.

In step S57, the control unit 30 executes the 1xEV-DO cell search about the cells stored in the 1/1xEV-DO common cell information database 37, in decreasing order of cell power, to measure the cell powers of the respective cells.

The control unit 30 ends the 1xEV-DO standby processing for one wake-up and becomes sleep state. After that, the operations of steps S51 to S58 are intermittently repeated.

If the information stored in the 1x cell search result database 311 and the information stored in the 1xEV-DO cell information database 38 are similar to the information in FIG. 15(b) and the information in FIG. 15(c), underlined PN3, PN6, PN9 and PN11 are common.

For this reason, the control unit 30 stores the cells PN6, PN9, PN3 and PN11 in decreasing order of cell power, in the common cell information database 37 as shown in FIG. 15(d).

The control unit 30 executes the 1xEV-DO cell search and measures the cell powers of respective PN6, PN9, PN3 and PN11, in order of storing in the common cell information database 37.

Thus, on the basis of the search result of the 1x neighbor cell search executed in the 1x Idle State and the search result of the 1xEV-DO cell search executed in the 1xEV-DO initial acquisition, the cells common to the search results are searched in decreasing order of cell power, in the 1xEV-DO Idle State.

For this reason, since the search is executed about the cells which are considered to have greater cell powers, the 1xEV-DO neighbor cell search can be executed by using a short search window and the time required for the search can be saved. Thus, the wake-up time in the 1xEV-DO paging reception can be saved and the battery consumption can be reduced. In addition, the configuration can be simplified by removing redundant hardware elements.

If the intermittent operation is executed in a long cycle of 20.48 seconds in the 1xEV-DO neighbor cell search of the 1xEV-DO paging reception, the mobile radio terminal apparatus 201 may move in a long distance during the search.

However, the search result of the 1x neighbor cell search that is executed in the cycle of 5.12 seconds is used in the mobile radio terminal apparatus 201 having the above-explained configuration, the cell search can be executed efficiently during the movement of the mobile radio terminal apparatus 201.

In case where the 1x serving cell currently receiving the service is the shared cell that also provides the 1xEV-DO service, the control unit 30 can save the time required for the 1xEV-DO neighbor cell search by the following control.

In the above-described shared cell, the same PN offsets are used for the 1x service and the 1xEV-DO service. If the cell power of the 1x service is sufficiently great, the cell power of the 1xEV-DO service is also sufficiently great.

For this reason, the control unit 30 executes the cell search about the 1xEV-DO cell by using the same PN offsets as those of the 1x serving cell that is currently in communication, instead of executing the 1xEV-DO neighbor cell search on the basis of the information stored in the 1/1xEV-DO common cell information database 37, as described above. According to this cell search, the 1xEV-DO neighbor cell search time can be further saved.

Figure 20:
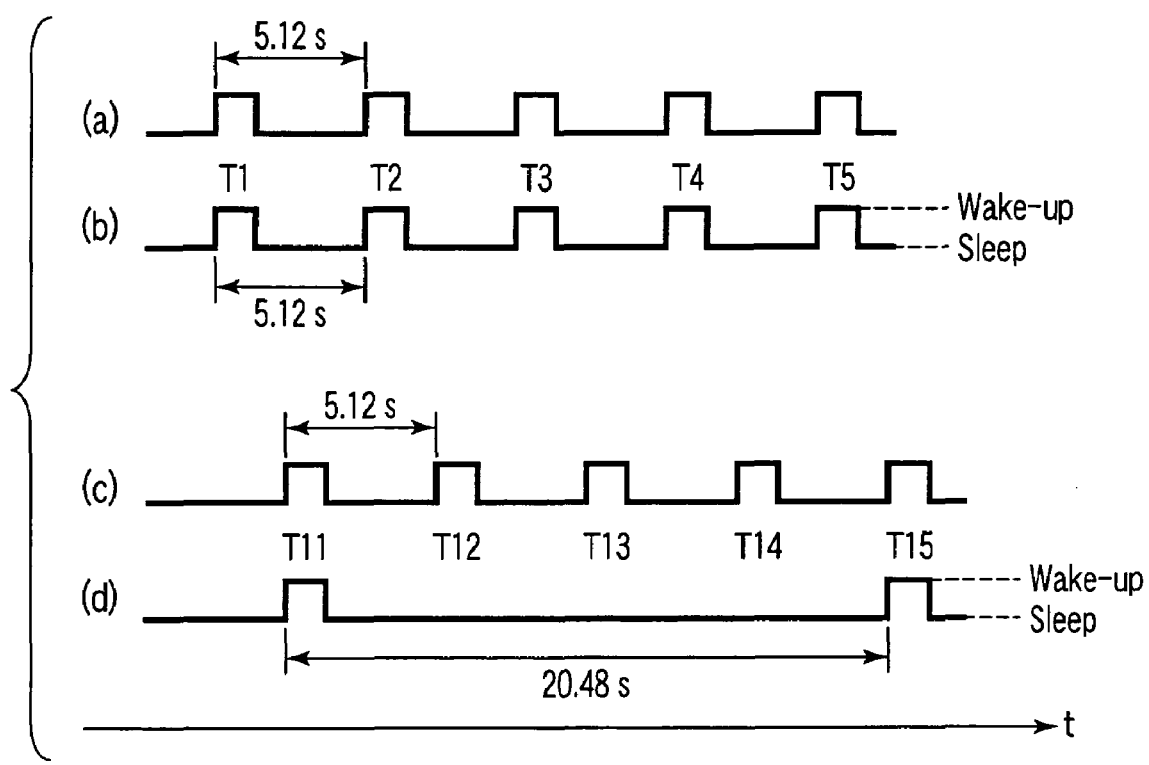
FIG. 20 shows time charts of operations of 1/1xEV-DO Idle State shown in FIG. 13.

Next, the operation of the 1/1xEV-DO Idle State shown in FIG. 13 will be explained. FIG. 20 shows a time chart at the operation.

The 1x paging signal is transmitted from the 1x cell with timings T1 to T5, in a cycle of 5.12 seconds, as shown in FIG. 20(a). The timings T1 to T5 are stored in the 1x paging counter 40 by the control unit 30.

The mobile radio terminal apparatus 201 executes intermittent 1x standby operation as shown in FIG. 20(b), on the basis of the timing information stored in the 1x paging counter 40, under control of the control unit 30.

In other words, the control unit 30 changes the sleep state to the wake-up state in accordance with the receive timing of the 1x paging signal. In the wake-up state, the control unit 30 executes the standby processing of the 1x Idle State (step S3).

For example, if the terminal apparatus becomes in the wake-up state with timing T1, the control unit 30 executes the discrimination of 1x incoming call for the mobile radio terminal apparatus 201, and the 1x neighbor cell search in preparation for the cell re-selection.

The common system timing maintaining unit 34 conducts synchronization again with the received 1x paging signal and updates the timing information stored in the 1x paging counter 40.

When the control unit 30 ends the predetermined processing, the control unit 30 changes the wake-up state to the sleep state and maintains the sleep state until next timing T2. After that, every time the timings T2, T3, T4, T5, come the control unit 30 changes the sleep state to the wake-up state and executes the same processing.

On the other hand, the 1xEV-DO paging signal is transmitted from the 1xEV-DO cell with timings T11 to T15, in a cycle of 5.12 seconds, as shown in FIG. 20(c). The timings T11 to T15 are stored in the 1xEV-DO paging counter 41 shown in FIG. 10.

The mobile radio terminal apparatus 201 executes intermittent 1xEV-DO standby operation in a cycle which is a natural number's multiple n of 5.12 seconds, for example, a cycle which is a quadruple (=n) of 5.12 seconds, as shown in FIG. 20(d), under control of the control unit 30.

For the intermittent receiving operation, the control unit 30 changes the sleep state to the wake-up state, at one time out of four times, of the timing information stored in the 1xEV-DO paging counter 41.

In other words, if the terminal apparatus becomes in the wake-up state with the timing T11, the terminal apparatus subsequently becomes in the wake-up state with the timing T15. Thus, when the sleep state is changed to the wake-up state, the standby processing of the 1xEV-DO Idle State (step S5) is executed.

If "n" is set at 4, the sleep state is changed to the wake-up state at one time in 20.48 seconds. However, since the system timing counter of the common system timing maintaining unit 34 becomes synchronized at every reception of the 1x paging signal, the wake-up timing for the 1xEV-DO paging signal is not off.

In case where the receiving interval of the 1xEV-DO paging signal is not so extended, the wake-up timing is not off even if the system synchronization is not established for the 1x service and the 1xEV-DO service.

Thus, by reducing the number of times of becoming in the wake-up state, power consumption at the simultaneous standby for the 1x service and the 1xEV-DO service can be reduced and the battery power can be saved, in the mobile radio terminal apparatus 201.

The mobile radio terminal apparatus 201 will be compared with, for example, a single-mode terminal apparatus corresponding to the 1x service alone. The single-mode terminal apparatus wakes up at every timing of arrival of the 1x paging signal and the standby time of this case is 200 hours.

If a dual-mode terminal apparatus corresponding to both the 1x service and the 1xEV-DO service wakes up at every timing of arrival of the 1x paging signal and every timing of arrival of the 1xEV-DO paging signal, the standby time is 100 hours, which is half of that of the single-mode terminal apparatus.

On the other hand, the mobile radio terminal apparatus 201 wakes up for the 1x paging signal at every timing, but wakes up for the 1xEV-DO paging signal at one time out of four times. Thus, the standby time is 160 hours.

The transmission of the paging signal is controlled in the following manner, in the base station of the 1xEV-DO cell.

If an incoming call arrives at the mobile radio terminal apparatus 201, the base station of the 1xEV-DO cell sequentially transmits the paging message for the mobile radio terminal apparatus 201 at n times. Since "n" is four in the above example, the base station transmits the paging message, for example, with timings T12, T13, T14 and T15.

The mobile radio terminal apparatus 201 cannot receive it with timing T12, T13 or T14, but can wake up and receive it with timing T15.

The natural number "n" may be preliminarily determined at designing of the system or may be dynamically recognized and determined by both the base station of the 1xEV-DO cell and the mobile radio terminal apparatus 201.

In the above-described embodiment, the standby cycle of the 1xEV-DO paging is fixed. However, the standby cycle may be dynamically varied by the control unit 30.

The base station of the 1xEV-DO cell acquires the IP address information and location information of the mobile radio terminal apparatus 201 from the terminal apparatus, with wake-up timings T11, T15, . . . If the mobile radio terminal apparatus 201 moves at a high speed, the possibility of failure in acquiring the information is increased.

The control unit 30 detects number of times "a" at which the 1x paging signal is received from the 1x serving cell and number of times "b" at which the 1x serving cell is changed. If "b/a" exceeds the threshold value th1, the control unit 30 determines that the mobile radio terminal apparatus 201 moves at a high speed, and sets "n" at a small value to shorten the standby cycle of the 1xEV-DO paging. Thus, the possibility of failure in receiving the information from the mobile radio terminal apparatus 201 can be reduced.

If "b/a" is smaller than the threshold value th2, the control unit 30 determines that the mobile radio terminal apparatus 201 moves at a low speed, and sets "n" at a great value to extend the standby cycle of the 1xEV-DO paging. Thus, the battery consumption can be saved.

If the 1x serving cell is changed, the number of times "a" is reset. If the natural number "n" is varied, the control unit 30 notifies the base station of the 1xEV-DO cell of the varied value "n" or the fact that the natural number "n" has been varied.

The mobile radio terminal apparatus 201 has been explained in the above descriptions. However, the present invention can also be applied to the mobile radio terminal apparatus 202.

The present invention is not limited to the embodiment described above, but the constituent elements of the invention can be modified in various manners without departing from the spirit and scope of the invention. Various aspects of the invention can also be extracted from any appropriate combination of a plurality of constituent elements disclosed in the embodiment. Some constituent elements may be deleted in all of the constituent elements disclosed in the embodiment. Moreover, the constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus for use in a radio communication system which comprises a plurality of first base stations conducting radio communication in a first radio scheme and transmitting a paging signal in a first cycle and a plurality of second base stations conducting radio communication in a second radio scheme and transmitting a paging signal in a second cycle, the mobile radio terminal apparatus comprising:
first receiving means for receiving a radio signal transmitted from the first base stations;
second receiving means for receiving a radio signal transmitted from the second base stations;
first control means for controlling the first receiving means to receive the paging signal by conducting an intermittent operation in the first cycle; and
second control means for controlling the second receiving means to receive the paging signal by conducting an intermittent operation in a cycle which is a multiple of natural number n of the second cycle.

2. The mobile radio terminal apparatus according to claim 1, further comprising:
first counting means for counting number of times $\underline{a}$ at which the first receiving means receives the paging signal;
second counting means for counting number of times $\underline{b}$ at which the first base stations capable of conducting communications are changed; and
threshold value controlling means for making the natural number n smaller if a rate of the value $\underline{b}$ to the value $\underline{a}$ exceeds a preset threshold value.

3. The mobile radio terminal apparatus according to claim 1, further comprising:
first counting means for counting number of times $\underline{a}$ at which the first receiving means receives the paging signal;
second counting means for counting number of times $\underline{b}$ at which the first base stations capable of conducting communications are changed; and
threshold value controlling means for making the natural number n greater if a rate of the value $\underline{b}$ to the value $\underline{a}$ is lower than a preset threshold value.

4. The mobile radio terminal apparatus according to claim 1, wherein the natural number n is a value based on number of times at which the paging signal is transmitted in the second cycle by the second bas stations if the second base stations notify an incoming call.

5. A mobile radio terminal apparatus for use in a radio communication system which comprises a plurality of first base stations conducting radio communication in a first radio scheme and transmitting a paging signal in a first cycle and a plurality of second base stations conducting radio communication in a second radio scheme and transmitting a paging signal in a second cycle,
the base stations being operated in synchronization with a common system timing,
the mobile radio terminal apparatus comprising:
first receiving means for receiving a radio signal transmitted from the first base stations;
second receiving means for receiving a radio signal transmitted from the second base stations;
detecting means for detecting the system timing in accordance with the signal received by the first receiving means;
first control means for controlling the first receiving means to receive the paging signal by conducting an intermittent operation in the first cycle based on the system timing detected by the detecting means; and
second control means for controlling the second receiving means to receive the paging signal by conducting an intermittent operation in a cycle which is a multiple of natural number n of the second cycle based on the system timing detected by the detecting means.

6. The mobile radio terminal apparatus according to claim 5, further comprising:
first counting means for counting number of times $\underline{a}$ at which the first receiving means receives the paging signal;
second counting means for counting number of times $\underline{b}$ at which the first base stations capable of conducting communications are changed; and
threshold value controlling means for making the natural number n smaller if a rate of the value $\underline{b}$ to the value a exceeds a preset threshold value.

7. The mobile radio terminal apparatus according to claim 5, further comprising:
first counting means for counting number of times a at which the first receiving means receives the paging signal;
second counting means for counting number of times $\underline{b}$ at which the first base stations capable of conducting communications are changed; and
threshold value controlling means for making the natural number n greater if a rate of the value $\underline{b}$ to the value $\underline{a}$ is lower than a preset threshold value.

8. The mobile radio terminal apparatus according to claim 5, wherein the natural number n is a value based on number of times at which the paging signal is transmitted in the second cycle by the second bas stations if the second base stations notify an incoming call.

* * * * *

UNITED STATES PATENT AND TRADEMARK OFFICE
CERTIFICATE OF CORRECTION

PATENT NO. : 7,099,691 B2 Page 1 of 1
APPLICATION NO. : 10/943892
DATED : August 29, 2006
INVENTOR(S) : Saito It is certified that error appears in the above-identified patent and that said Letters Patent is hereby corrected as shown below:

Claim 4, column 21, line 15, change "bas" to --base--.

Claim 6, column 22, line 17, change "value a" to --value $\underline{a}$--.

Claim 7, column 22, line 21, change "times a" to --times $\underline{a}$--.

Claim 8, column 22, line 34, change "has" to --base--.

Signed and Sealed this

Twenty-eighth Day of November, 2006

JON W. DUDAS
*Director of the United States Patent and Trademark Office*